United States Patent [19]

Spiros

[11] Patent Number: 5,843,292

[45] Date of Patent: Dec. 1, 1998

[54] ELECTROLYSIS SYSTEMS

[75] Inventor: Spiro Ross Spiros, Mascot, Australia

[73] Assignee: Hydrogen Technology Ltd., New South Wales, Australia

[21] Appl. No.: 610,968

[22] Filed: Mar. 5, 1996

Related U.S. Application Data

[63] Continuation of PCT/AU94/00532 Aug. 6, 1994.

[30] Foreign Application Priority Data

| Sep. 6, 1993 | [AU] | Australia | ................................ | PM1054 |
| Apr. 19, 1994 | [AU] | Australia | ................................ | PM5174 |
| Aug. 2, 1994 | [AU] | Australia | ................................ | PM7227 |
| Aug. 4, 1994 | [AU] | Australia | ................................ | PM7267 |

[51] Int. Cl.$^6$ .............................. C25B 9/00; C25B 11/02; C25B 15/00

[52] U.S. Cl. .......................... 204/258; 204/267; 204/270; 204/284; 204/296

[58] Field of Search .................................... 204/258, 270, 204/267, 256, 278, 271; 205/628, 633, 637

[56] References Cited

U.S. PATENT DOCUMENTS

| 1,597,552 | 8/1926 | Stuart . | |
| 3,759,815 | 9/1973 | Larsson | ................................... 204/268 |
| 3,893,902 | 7/1975 | Loftfield et al. | .................... 204/275 X |
| 3,902,984 | 9/1975 | Yoshida et al. | ......................... 204/254 |
| 4,014,777 | 3/1977 | Brown | ..................................... 204/270 |
| 4,115,237 | 9/1978 | Woodard, Jr. et al. | ................. 204/258 |
| 4,133,301 | 1/1979 | Fujiwara | ................................. 126/413 |
| 4,134,805 | 1/1979 | Frohler et al. | ....................... 204/269 X |
| 4,184,931 | 1/1980 | Inoue | ...................................... 205/630 |
| 4,248,689 | 2/1981 | Cunningham | ........................... 204/252 |
| 4,264,426 | 4/1981 | Kuusinen et al. | ...................... 204/242 |
| 4,369,102 | 1/1983 | Galluzzo et al. | ........................ 204/228 |
| 4,392,937 | 7/1983 | Schmitt et al. | .......................... 204/269 |
| 4,424,105 | 1/1984 | Hanson | .................................. 204/228 |
| 4,425,215 | 1/1984 | Henes | ................................ 204/270 X |
| 4,457,816 | 7/1984 | Galluzo et al. | .................... 204/270 X |
| 4,747,925 | 5/1988 | Hasebe et al. | ........................... 204/270 |
| 5,176,809 | 1/1993 | Simuni | ..................................... 205/637 |
| 5,244,558 | 9/1993 | Chiang | ............................... 204/271 X |
| 5,279,260 | 1/1994 | Munday | .............................. 204/258 X |
| 5,407,348 | 4/1995 | Mims et al. | ............................. 431/346 |

FOREIGN PATENT DOCUMENTS 2 147 312   3/1973   Germany .

OTHER PUBLICATIONS

Membrane Processes R. Rautenbach and R. Albrecht Institut fur Verfahrenstechnik RWTH Aachen. West Germany. translated by Valerie cottrell, John wiley & Sons Chichester–New York–Brisbane–Toronto–Singapore.

Jon B. Pangborn et al., Analysis of Thermochemical Water–Splitting Cycles, *Hydrogen Energy*, Part A, Hydrogen Economy Miami Energy Conference, 1974, pp. 499–508 (no month).

(List continued on next page.)

*Primary Examiner*—Donald R. Valentine
*Attorney, Agent, or Firm*—Cushman, Darby & Cushman IP Group of Pillsbury, Madison & Sutro LLP

[57] ABSTRACT

A cell arrangement for the electrolysis of water to liberate hydrogen and oxygen gases is described. A cell unit (125) has a stacked arrangement of segmentation disks (114), a first type of (anode) cell plates (90), a second type of (cathode) cell plates (98) and separation membranes (116). Interconnecting conductive shafts (126–131) pass through holes (100, 102) of the cell plates (90,98) to have selective electrical interconnection therewith. Water and electrolyte are supplied by inlet ports (108, 110) to immerse the cell plates (90, 98). The membranes (116) normally isolate adjacent cathode and anode plates (90, 98) from the mixing of liberated oxygen and hydrogen gases while allowing ionic current to flow. By selective adjustment of the water/ electrolyte pressure differential on the respective sides of the separation membranes (116), the admixture of the liberated gases can be produced. The liberated gases discharge through outlet ports (104,106).

43 Claims, 23 Drawing Sheets

OTHER PUBLICATIONS

F.C. Jensen et al., Hydrogeneration Through Static Feed Water Electrolysis, *Hydrogen Energy*, Part A, Hydrogen Economy Miami Energy Conference, 1974, pp. 425–439 (no month).

J. O'M. Bockris, On Methods For the Large–Scale Production of Hydrogen From Water, *Hydrogen Energy*, Part A, Hydrogen Economy Miami Energy Conference, 1974, pp. 371–403 (no month).

R. Rautenbach et al., Membrane Processes, Gas Permeation, Chapter 13, 1989, pp. 422–432 (no month).

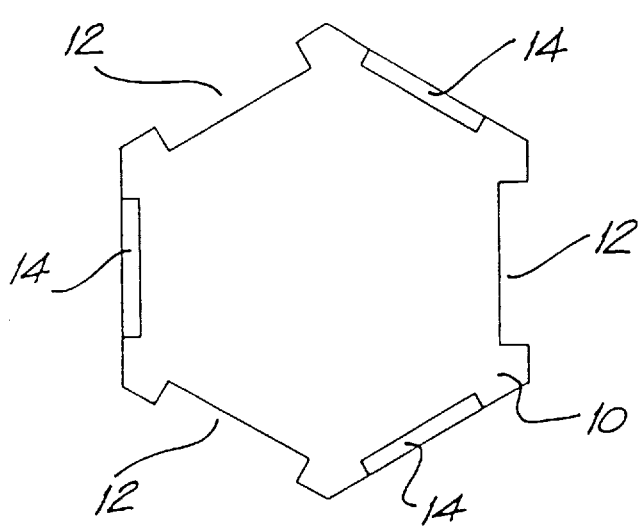
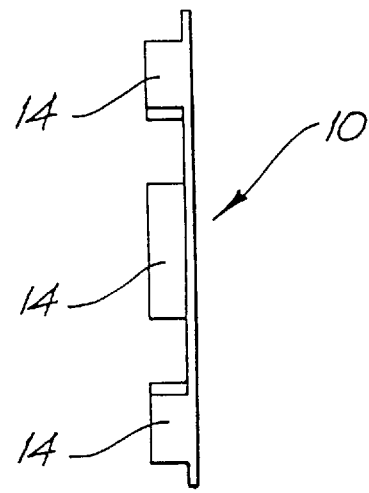
FIG. 1a  FIG. 1b
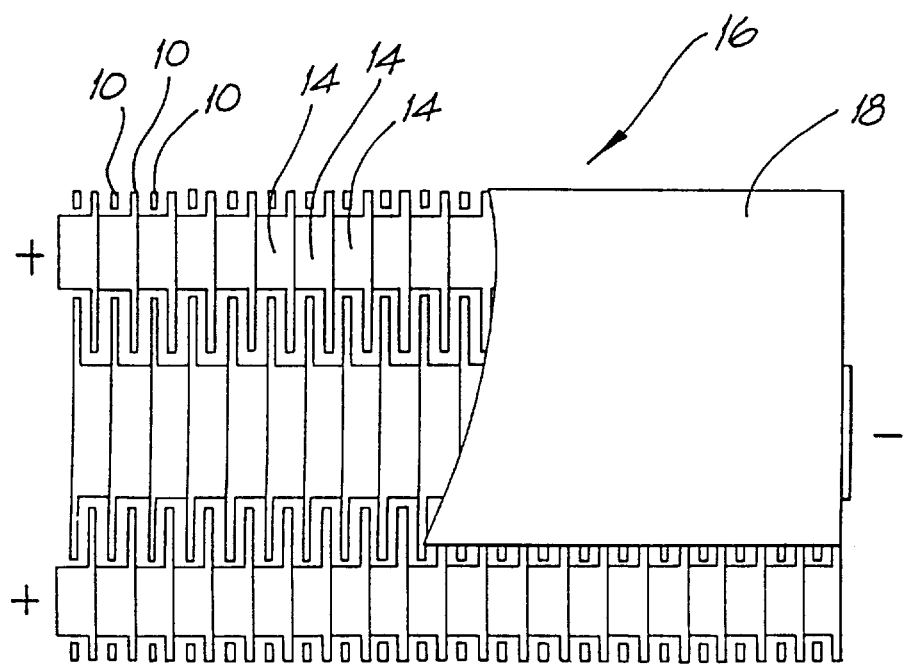
FIG. 2

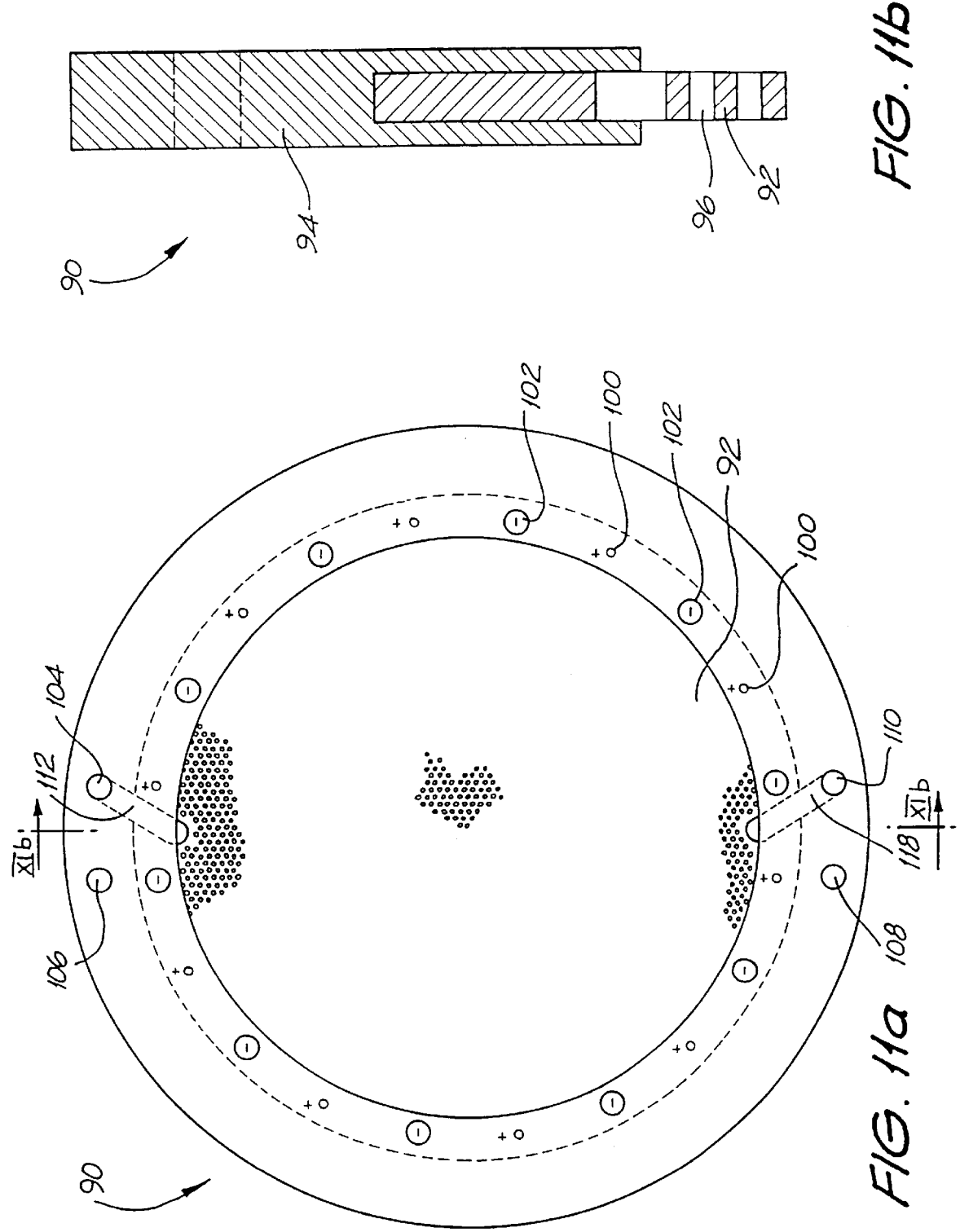

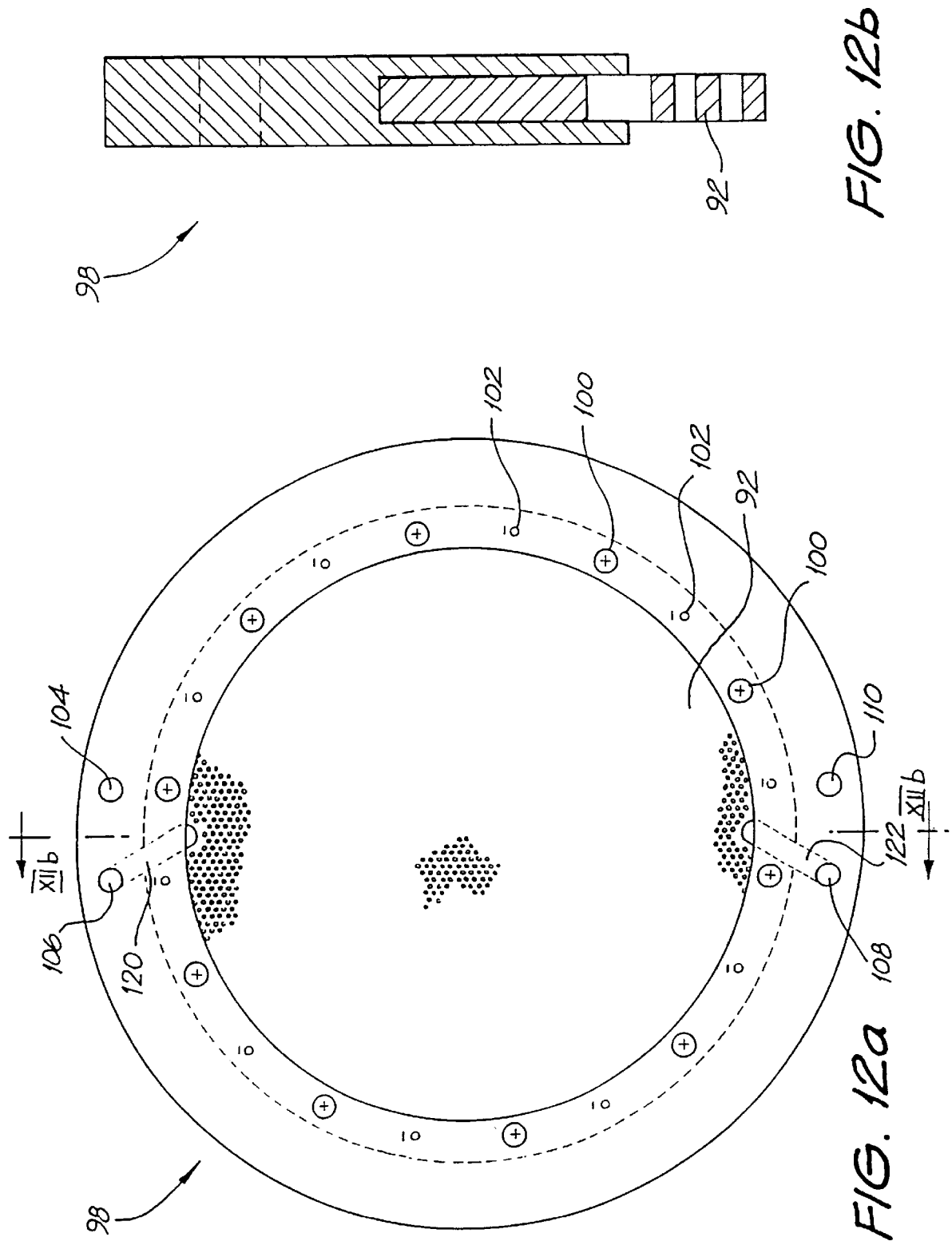

ELECTROLYSIS SYSTEMS

This is a Continuation of International Appln. No. PCT/AU94/00532, filed Sep. 6, 1994, which designated the U.S.

TECHNICAL FIELD OF THE INVENTION

The present invention relates to the generation of hydrogen gas and oxygen gas from water, either as an admixture or as separated gases, by the process of electrolysis, and relates further to applications for the use of the liberated gas. Embodiments of the invention particularly relate to an apparatus for the efficient generation of these gases, and to the use of the gases as a thermal source in atomic welding or cutting, and in gaseous waste disposal.

BACKGROUND ART

The technique of electrolysing water in the presence of an electrolyte such as sodium hydroxide (NaOH) or potassium hydroxide (KOH) to liberate hydrogen and oxygen gas ($H_2$, $O_2$) is well known. The process involves applying a DC potential difference between two or more anode/cathode electrode pairs and delivering the minimum energy required to break the H—O bonds (i.e. 68.3 kcal per mole @STP). The gases are produced in the stoichiometric proportions for $O_2:H_2$ of 1:2 liberated respectively from the anode (+) and cathode (−).

Reference can be made to the following texts: "Modern Electrochemistry, Volume 2, by John O'M. Bockris and Amulya K. N. Reddy, (Plenum Publishing Corporation)", "Electro-Chemical Science," by J. O'M. Bockris and D. M. Drazic, (Taylor and Francis Limited) and "Fuel Cells, Their Electrochemistry," by J. O'M. Bockris and S. Srinivasan, (McGraw-Hill Book Company).

A discussion of experimental work in relation to electrolysis processes can be obtained from "Hydrogen Energy, Part A, Hydrogen Economy Miami Energy Conference," Miami Beach, Fla., 1974, edited by T. Nejat Veziroglu, Plenum Press. The papers presented by J. O'M. Bockris on pages 371 to 379, by F. C. Jensen and F. H. Schubert on pages 425 to 439 and by John B. Pangborn and John C. Sharer on pages 499 to 508 are of particular relevance.

On a macro-scale, the amount of gas produced depends upon a number of variables, including the type and concentration of the electrolytic solution used, the anode/cathode electrode pair surface area, the electrolytic resistance (equating to ionic conductivity, which is a function of temperature), the achievable current density and anode/cathode potential difference. The total energy delivered must be sufficient to disassociate the water ions to generate hydrogen and oxygen gases, yet avoid plating (oxidation/reduction) of the metallic or conductive non-metallic materials from which the electrodes are constructed.

Reference also is made to prior art Australian Patent No. 487062 to Yull Brown, that discloses an electrolysis cell arrangement to produce hydrogen and oxygen on demand, together with a safety device preventing the generation of excess pressure of the liberated gases. FIG. 2 of the Brown patent shows a number of electrodes (20a,20b) in a series electrical arrangement between two terminals (22), across which a voltage is applied. The cell (20) produces a gas volumetric flow rate output, and if that output is insufficient for a particular application, then a larger number of individual cell units must be provided which are all electrically connected in series.

The end result is a large structure to be supported.

It is also not possible to produce high gas flow rates (of the order of 10,000 liters per hour) on demand from the prior art apparatus without the use of expensive and complicated equipment, and even then the equipment suffers from low efficiencies in the conversion of electrical energy to generate the hydrogen and oxygen gases. Thus, the large scale commercial implementation of such apparatus is not economically viable.

Admixed hydrogen and oxygen gases (or hydroxy gas) are used as a thermal source when burnt in a stream, for example, in furnaces. Hydrogen alone is used for atomic cutting and often for atomic welding, although the device described in the Brown patent performed atomic welding with admixed hydrogen and oxygen. Recent industry practice clearly exemplifies that the presence of oxygen in a plasma arc causes severe oxidation of the tungsten electrodes.

One of the problems experienced in implementing these applications is the need to incorporate electrical switchgear to transform main supply voltages to a level suitable for a bank of electrolysis cells (i.e. by step-down transformers). The resulting completed arrangement is electrically inefficient and cumbersome, and also can be expensive if precise voltage and current regulation (hence gas flow regulation) is required.

Combusted hydrogen and oxygen gases mixed into a single stream burn at a very high temperature, typically of the order of 6000° C. Hydrogen/oxygen welding sets are generally known to comprise of a welding tip or hand piece connected by a dual gas hose to separate supplies of oxygen and hydrogen.

There are four other common types of welding apparatus and techniques in use. These are oxy-acetylene welding, electric arc welding, MIG (metal-inert-gas)/TIG (tungsten-inert-gas) systems and plasma cutting.

It is estimated that more than 100,000 oxy-acetylene sets are used in Australia. Of those, approximately 70% are used primarily for cutting metals, with the remainder being used as a heat source, for fusion welding of sheet metal, brazing, silver soldering and the like. Typically, oxy-acetylene sets can weld thicknesses of metal between 0.5 mm to 2 mm. Further, thicknesses up to 140 mm can be cut, but only where the steel contains a high percentage of iron. The reason for this is that the iron and the oxygen are required to support the oxidation process which induces the cutting effect. The acetylene gas provides the initial temperature to start the oxidation reaction, being typically 850° C. Oxy-acetylene sets require a bottled supply of both acetylene and oxygen gas. Hence, the bottles must be bought or rented, then continually maintained and refilled with use.

Electric arc welding is a method used for welding metals of greater than 1.5 mm in thickness. The principle of operation is that a hand piece is supplied with a consumable electrode, and the work piece forms the other electrode. An AC or DC potential difference is created between the electrodes, thus causing an arc to be struck when the hand piece is brought into proximity of the work piece. The arc can be used to fuse or weld metal pieces together.

MIG systems are based around a continuous wire feed system. In one known arrangement, the consumable wire is shrouded by argon gas (or a plasma) which typically is provided from a bottled supply. TIG systems, on the other hand, require the filler wire to be hand-fed into the weld pool. MIG/TIG systems can weld metals from between 1 mm to 20 mm in thickness. These metals, typically include stainless steel, aluminium, mild steel and the like. Reference can be made to a text "The Science and Practice of Welding, Volume 2, A. C. Davies, Cambridge University Press" with respect to a plasma MIG processes.

Plasma cutting is a method of cutting by introducing compressed air (comprising predominantly nitrogen) to a DC electric arc, thereby producing very high temperatures (about 15,000° C.) and so stripping electrons from the nitrogen nucleus to form a high temperature plasma. This plasma can be utilized to cut ferrous and non-ferrous materials such as mild steel, stainless steel, copper, brass and aluminium. Available plasma cutters can cut up to a 25 mm thickness and have the advantage of not requiring bottled gas, but rather utilize free air. Reference can be made to the text "Gas Shielded Arc Welding," by N. J. Henthome and R. W. Chadwick, (Newnes Technical Books.) with respect to plasma cutting.

As can be seen from the discussion of the prior art, no one unit or system has the capability of performing all welding and cutting functions, and typically, one of the systems already described would be chosen over another for any particular job. This then requires that metal workers or other metal trade industry manufacturers must purchase and maintain a number of different types of welding units in order to have the capability to handle any job on demand. The costs associated with the purchase of replacement bottled gas also are very high.

DISCLOSURE OF THE INVENTION

It is a preferred object of the present invention to provide an arrangement whereby hydrogen and oxygen gases can be produced by electrolysis in a manner that avoids one or more of the foregoing disadvantages. In that sense, the electrolysis apparatus is compact and offers greater efficiencies than the prior art for comparative gas flow rates.

It is a further preferred object of the invention to provide an improved structure for an electrolysis cell for use in the generation of hydrogen and oxygen gas. The electrolysis cell can be used in hydrogen/oxygen welding or hydrogen plasma cutting. Other applications may relate to industrial processes where a combustible source of fuel is required, such as incinerators, and to the incineration of intractable wastes.

It is a yet further preferred object to provide an electrolysis cell arrangement that allows the selective separation or admixture of hydrogen and oxygen gas into individual gas streams.

The present invention further preferably is directed to provision of a unitary welding unit which can provide all the welding or cutting requirements of a user. Advantageously, no bottled supply of hydrogen or oxygen is required. A bottled supply of any other gas also required is not. For example, argon is not required in shrouded MIG/TIG applications.

It is a yet further preferred object of the invention to provide a flashback arrester for a hydrogen/oxygen welding or hydrogen plasma cutting tip.

Therefore, the invention discloses a cell arrangement for the electrolysis of water to liberate hydrogen and oxygen gases, the arrangement comprising:

a plurality of anode-forming electrodes in a stacked relation, each anode electrode comprising a flat plate through which passes one or more common first conductive interconnecting members; and a plurality of cathode-forming electrodes in a stacked relation, each cathode electrode comprising a flat plate through which passes one or more common second conductive interconnecting members;

and wherein the anode electrodes and the cathode electrodes are interleaved.

The invention further discloses a cell arrangement for the electrolysis of water to liberate hydrogen and oxygen gases, the arrangement comprising:

a plurality of anode-forming electrodes interconnected by one or more first common conductive members to be electrically in parallel, the anode electrodes being interleaved with a plurality of cathode forming electrodes interconnected by one or more second conductive members to be electrically in parallel, the anode electrodes and cathode electrodes forming a cell unit; and a plurality of the cell units being electrically connected in series.

The invention further discloses a cell arrangement for the electrolysis of water to liberate separated or admixed hydrogen and oxygen gases, the arrangement comprising:

a plurality of anode-forming electrodes arranged in a stacked relation, each anode electrode comprising a flat plate through which passes one or more first conductive interconnecting members;

a plurality of cathode-forming electrodes arranged in a spaced linear stacked relation, each cathode electrode comprising a flat plate through which passes one or more second conducting interconnecting members; wherein the anode electrodes and the cathode electrodes are interleaved; and a plurality of membranes, each membrane located between an adjacent anode electrode and cathode electrode, the membranes allowing the passage of ionic current between adjacent anode and cathode electrodes, but selectively blocking the flow of gas therethrough dependant upon a pressure differential between opposite sides of a membrane.

The invention yet further discloses an electrolysis unit for the liberation of oxygen and hydrogen gases, the unit comprising:

a plurality of anode-forming electrodes interleaved with a plurality of cathode forming electrodes;

a plurality of separation membranes between each adjacent cathode and anode electrode; and means for supplying at least water to the anode and cathode electrodes, the supply means being operable to control pressure differential of the at least the water on opposed sides of each membrane to selectively maintain separation or admixture of liberated oxygen and hydrogen gases.

The invention further discloses a burner arrangement for use in the thermal destruction of gaseous pollutants, the burner comprising:

a hemispherical burner chamber;

a supply of hydrogen and oxygen gases in communication with the burner chamber via a tortuous path exiting by a plurality of concentrically arranged nozzles directed towards the epicenter of the hemispherical chamber; and an inlet for the supply of the gaseous pollutants;

and wherein the gaseous pollutants are combusted together with the hydrogen and oxygen gases.

The invention yet further discloses a multi-modal welding and cutting generator, comprising:

a power supply controllable to produce a plurality of AC and DC output voltage sources; and an electrolysis unit coupled to the power supply, and operable to selectively produce hydrogen and oxygen separately or as admixed hydrogen and oxygen from a supply of water by electrolysis due to a DC voltage source of the power supply; the hydrogen, oxygen and admixed hydrogen and oxygen, together with the output voltage sources, being available for connection to a welding and/or cutting apparatus.

The invention yet further discloses a flashback arrester for a welding tip having use with combusted gases, the arrester comprising a meshed barrier in the stream of a passage for the gases to be combusted, the meshed barrier having an opening with a size to allow free passage of the gases, and to impede passage of a flashback by the flashback flame so that it is unable to pass the barrier and is extinguished.

BRIEF DESCRIPTION OF THE DRAWINGS

FIGS. 1a and 1b show a single cell plate respectively as a plan view and side view;

FIG. 2 shows a stacked array of cell plates;

FIGS. 11a and 11b show a yet further embodiment of a cell plate;

FIGS. 12a and 12b show a complementary cell plate to that of FIGS. 11a and 11b;

FIG. 15b shows a stylised representation of FIG. 15a;

FIG. 15c shows an electrical equivalent circuit of FIG. 15a;

FIG. 16 shows a gas collection system for use with the cell bank separation system of FIGS. 14 and 15a;

DETAILED DESCRIPTION AND BEST MODE OF PERFORMANCE

Figure 3:
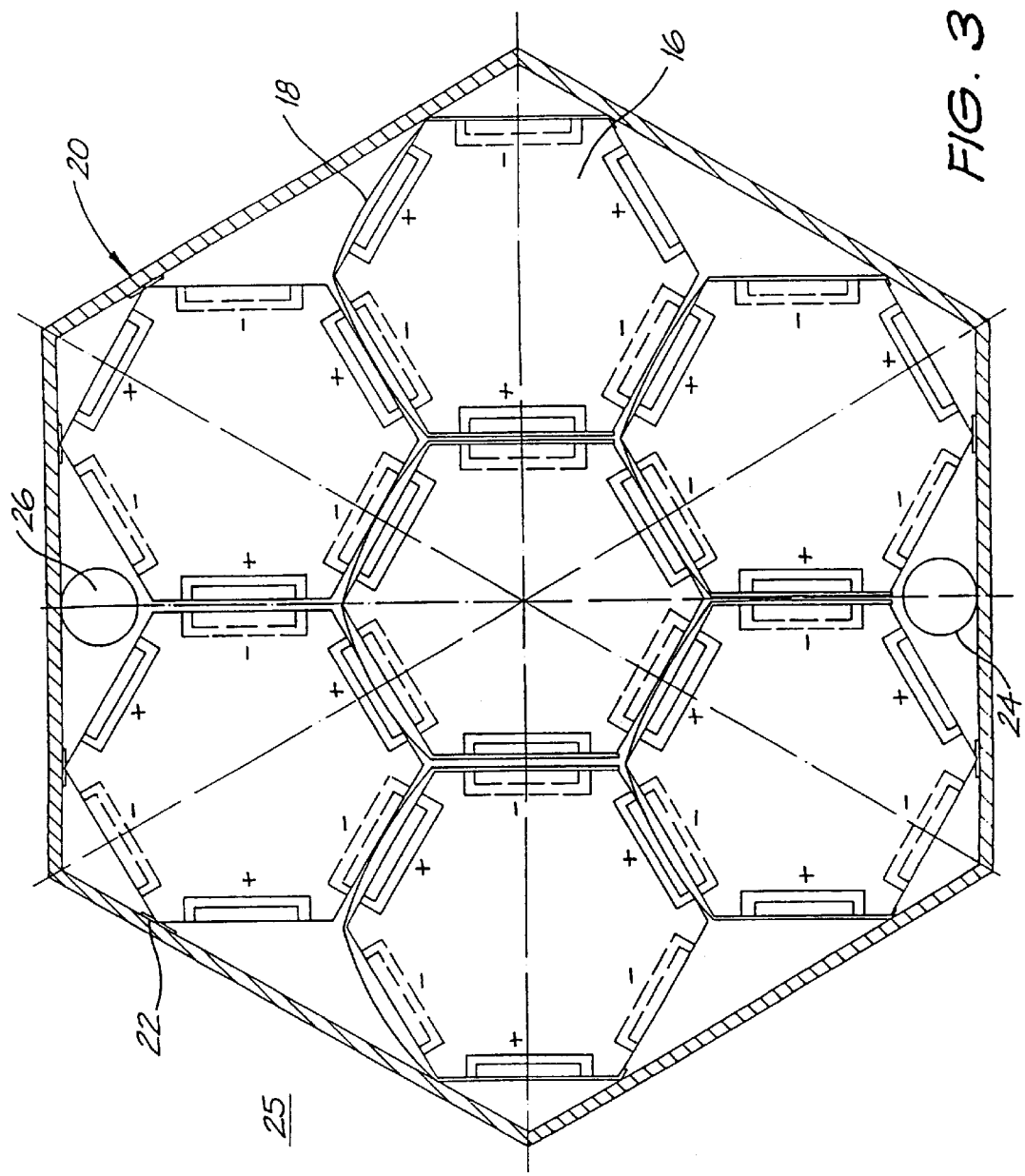
FIG. 3 shows, as a vertical cross-sectional view, an electrolysis cell bank.

An electrolysis cell bank embodying the invention is constructed of a number of hexagonally shaped electrolysis cell plates 10, one of which is shown in plan a in FIG. 1a and as a side view in FIG. 1b. Each plate 10 has three slots 12, each one arranged in alternating side edges of the plate 10. The other sides of the cell plate 10 each are provided with a conductive bridge or flange 14. Typically twenty individual cell plates 10 are stacked to form one complete cell 16 as shown as a side view in FIG. 2. The total number of plates can vary in accordance with the required surface area, and thus, also is a function of plate diameter.

The stacking of adjacent individual cell plates 10 is in a reversed order, so that the conductive bridges 12 of adjacent plates extend in opposed directions and with a relative rotational offset of 60°. This rotational offset is provided so that adjacent plates 10 are to bear opposite polarity. The conductive bridges 14 are long enough to pass through a corresponding slot 12 in an adjacent plate 10, without contacting that plate, and contact the next subsequent plate to form a conductive path between each alternate plate. In this way, the completed cell structure 16 has three positive end terminals and three negative end terminals, although FIG. 2 shows only two of the positive terminals and one of the negative terminals. The cell stack 16 is enveloped by an insulating case 18 (shown in cut-away form). The cell plates 10 shown in FIGS. 1a, 1b and 2 are suited to form in a parallel electrical arrangement, with each adjacent two cell plates 10 forming either the anode or the cathode.

Parallel stacked flat cell plates are described in Australian Patent No. 487062. In that patent, a stack of twenty cell plates typically requires a potential difference across the individual electrodes of each cell plate in the range of 1.55–2.0 volts to liberate hydrogen and oxygen gas from the water containing an electrolyte of typically 15% sodium hydroxide solution.

FIG. 3 shows, as a vertical cross-sectional view, seven complete cell stacks 16 arranged in a hexagonal matrix and enclosed by a steel casing 20, thereby to provide an electrolysis cell bank 25. The cell stacks 16 are insulated from the steel casing 20 by nylon insulating bushes 22. The electrical interconnection of the individual cell stacks 16 is not shown, but typically the cells are connected between their respective positive (+) and negative (−) terminals by straps to form a series connection.

It sometimes can be the case that a parallel interconnection of the cell stacks 16 is implemented. The actual electrical interconnection will depend upon the number of individual cell plates 10 comprising each cell stack 16, the supply voltage and the current that can be drawn from the supply.

Water is consumed as the hydrogen and oxygen gas is liberated during the electrolysis reaction. One liter of water generates 1860 liters of admixed oxygen and hydrogen at STP, in the volumetric proportion noted above. In the arrangement shown water is continually supplied through the inlet port 24.

The nylon covers 18 separating adjacent stacks have the benefit of directing the liberated gas upwardly to be collected by, for example, a gas outlet 26 located at the top of the electrolysis cell bank 25. By virtue of volumetric displacement in a ratio of 1:1860, the liberated gases are self-pressurizing as they pass from the outlet port 26 into the interconnecting pipe work (not shown), which has a far narrower cross-sectional area than that of the cell bank.

Figure 4:
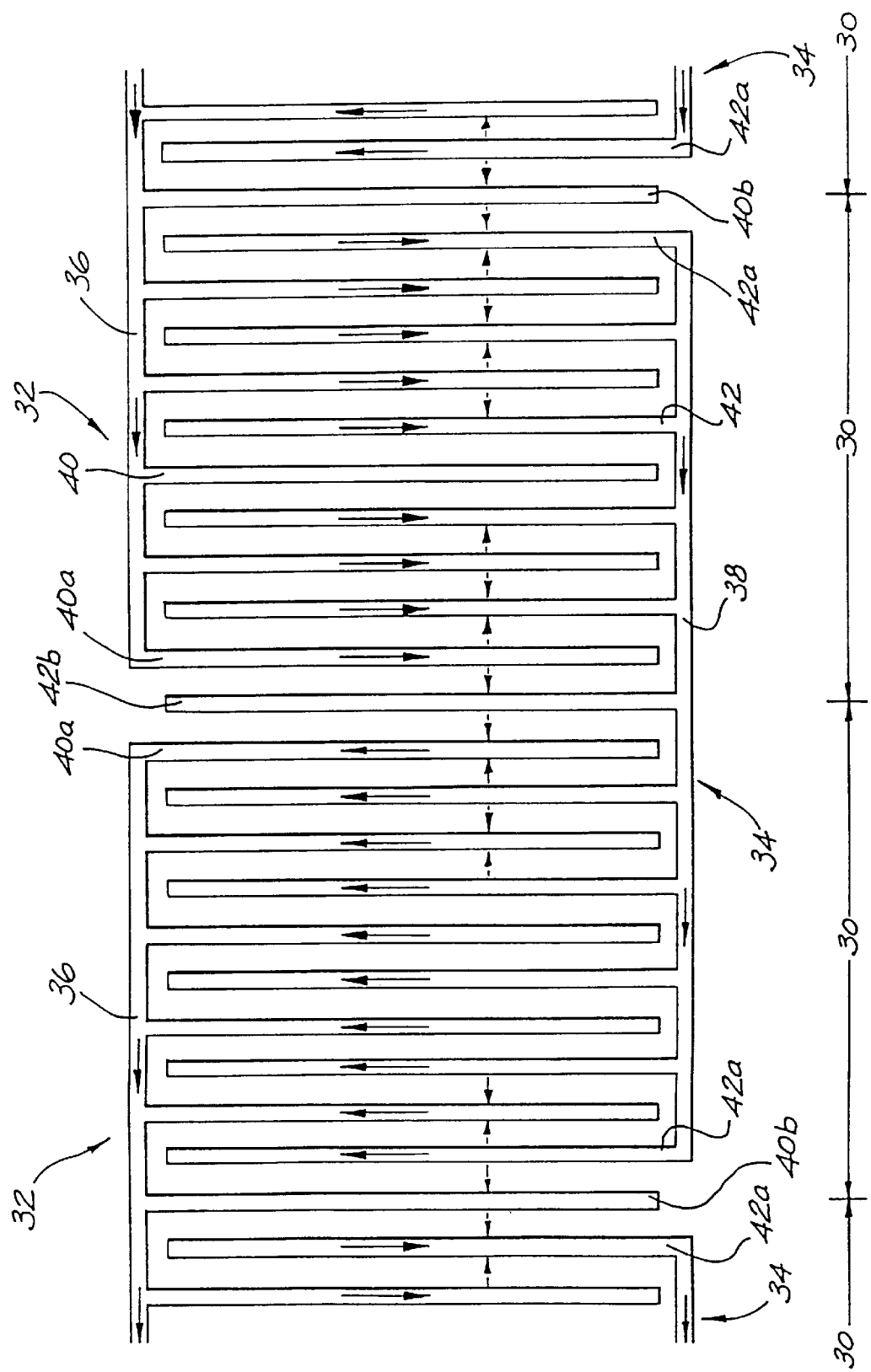
FIG. 4 is a vertical cross-sectional view showing an arrangement of electrodes of part of another electrolysis cell bank embodying the invention.

FIG. 4 is a vertical cross-sectional view showing the mechanical configuration of an electrolysis cell in accordance with a further embodiment. The basic cell unit 30 is constituted by respective halves of a pair of interdigitated electrodes 32, 34 arranged much in the nature of interleaved combs. Each electrode is formed by a conductive spine 36, 38, typically constructed of resin bonded carbon material, mild steel or conductive polymers, from which extend eleven finger-like plates 40, 42, also constructed of carbon, steel or conductive polymer.

Figure 5:
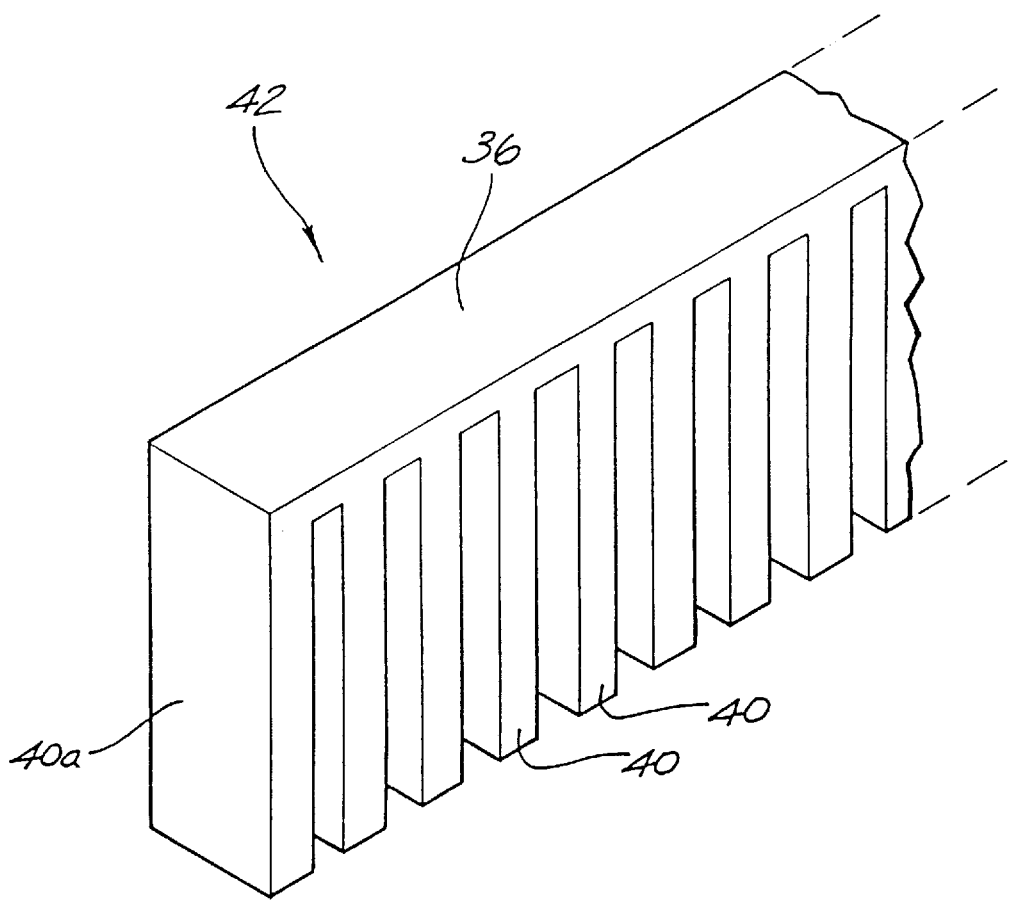
FIG. 5 is a perspective view of part of one electrode shown in FIG. 4.

FIG. 5 is a perspective view of one of the electrodes 32 in which the spine 36 and plates 40 are rectangular in shape. The electrodes need not necessarily be of the shape shown, but rather can take on many other forms, one example of which will presently be described. The common requirement for all such configurations is that the plates be parallel and interconnected by a common member usually arranged orthogonally to the plates.

Each pair of electrodes 32, 34 are in a staggered arrangement so that the respective outermost plates 40a, 42a are offset by approximately one half of the total length of each electrode 32, 34. The respective mid-point plates are identified by the reference numerals 40b and 42b.

Figure 6:
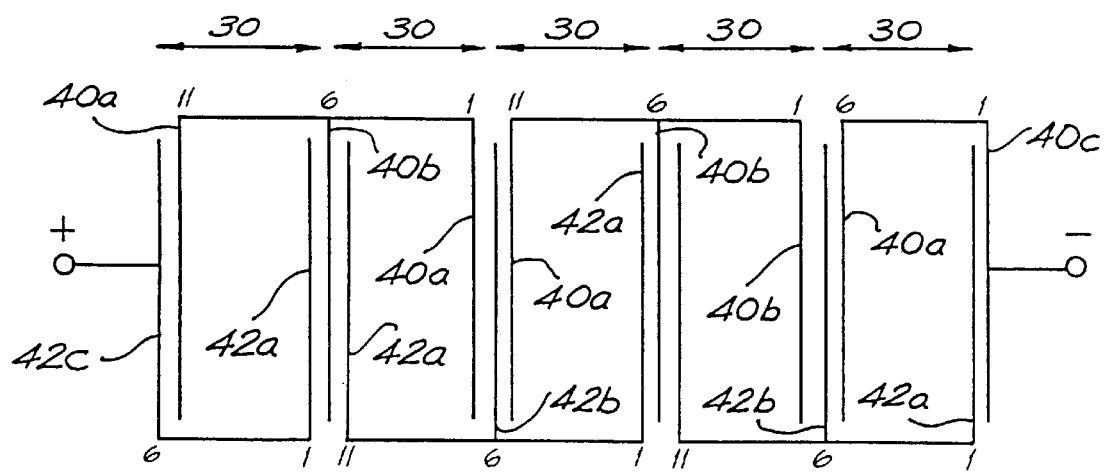
FIG. 6 is a simplified representation of a series arrangement of the electrodes shown in FIG. 4.

FIG. 6 shows the staggering arrangement in a simplified form. Every sixth plate is located in the space formed between the first and eleventh plate of the respective opposed adjacent electrodes.

Referring to FIG. 4 again, two complete cell units 30 and a part of the next respective adjacent cell units are shown. The total number of cell units is governed by the DC supply voltage, since a minimum anode/cathode voltage is required to derive the electrolysis process, and each adjacent cell unit is in a series electrical connection of the parallel-arranged plates 40, 42. In the electrolysis process, the cells 30 are immersed in water and electrolyte and a DC voltage is applied between the end-most plates 40c, 42c causing elemental ionic currents (some of which are represented by the dashed arrows) to flow between the adjacent plates 40, 42, and some current-wise along the respective spines 36, 38 and plates 40, 42 (shown by the solid arrows). A different current path is followed at each mid-plate. For example, the DC current travels from one end cell plate 42a, through the electrolyte, passing through the mid cell plate 40b and again through the electrolyte to the next end cell plate 42a. This process causes the accumulation of net positive charge on one side of the mid-plate 40b, and a negative charge on the other side.

The ionic current flow is accompanied by disassociation of the water molecules such that oxygen and hydrogen gas is produced respectively at the anode plate and cathode plate surfaces. The cathode plate surfaces are those surfaces towards which ionic current flows. The converse applies for the anode plate surfaces.

The voltage applied across the end-most plates 40c is divided equally between the constituent cell units 30, with that fraction of the supplied voltage appearing between the respective outer-most plates and mid-point plates 40a & 42b, 40b & 42a.

The achievable current density is limited, in part, by the effective electrical resistance of the electrolytic solution. The smaller the gap between adjacent plates 40, 42 the less is the resistance. The interdigitated nature of the electrodes 32, 34 means that there is a large surface area available per unit volume, and there is a minimum separation between electrode plates in all instances. In that case, the resistance of the electrolyte is kept low, hence efficiency of the conversion of electrical energy to generate the hydrogen and oxygen gases is greater than in the prior art.

By virtue of the specific arrangement shown, it is not necessary to isolate each individual cell unit 30 from adjacent ones thereof. The ionic flow naturally will take the path of least resistance, hence short-circuits between cell units 30, being a path otherwise of greater resistance, are avoided. A large number of cells therefore can be arranged to extend longitudinally, and allow direct connection to a rectified mains power supply, thus obviating the need to electrically interconnect groups of cell units by strapping, as has been done in the prior art.

Each individual cell unit 30 satisfies the operational criteria regarding voltage, the surface area of the plates and so on, to successfully electrolyze water, and thereby operates essentially independently of the adjacent cell units 30.

Testing has established that for a temperature range of 90° C. to 50° C., a DC voltage in the range 1.47–1.56 V applied across one cell unit 30 (i.e. across one half of a complete electrode 32 or 34) a minimum (and the optimum) anode current density of 0.034 A/cm$^2$ is required to generate a gas flow rate of about 340–300 l/h per kWh respectively. The discovery that the minimum plate surface area corresponds to the optimum gas flow rate means that the total volume occupied can be kept to a minimum. By way of specific example, a rectified 240 V$_{rms}$ main voltage nominally results in an average DC voltage of 215 V, hence for direct connection to the main supply via a rectifier (i.e. without requiring a step-down transformer), a total of about one hundred and forty cells are required. It is particularly advantageous not to require voltage transformation equipment in terms of equipment cost, technical simplicity and the avoidance of losses.

Figure 7A:
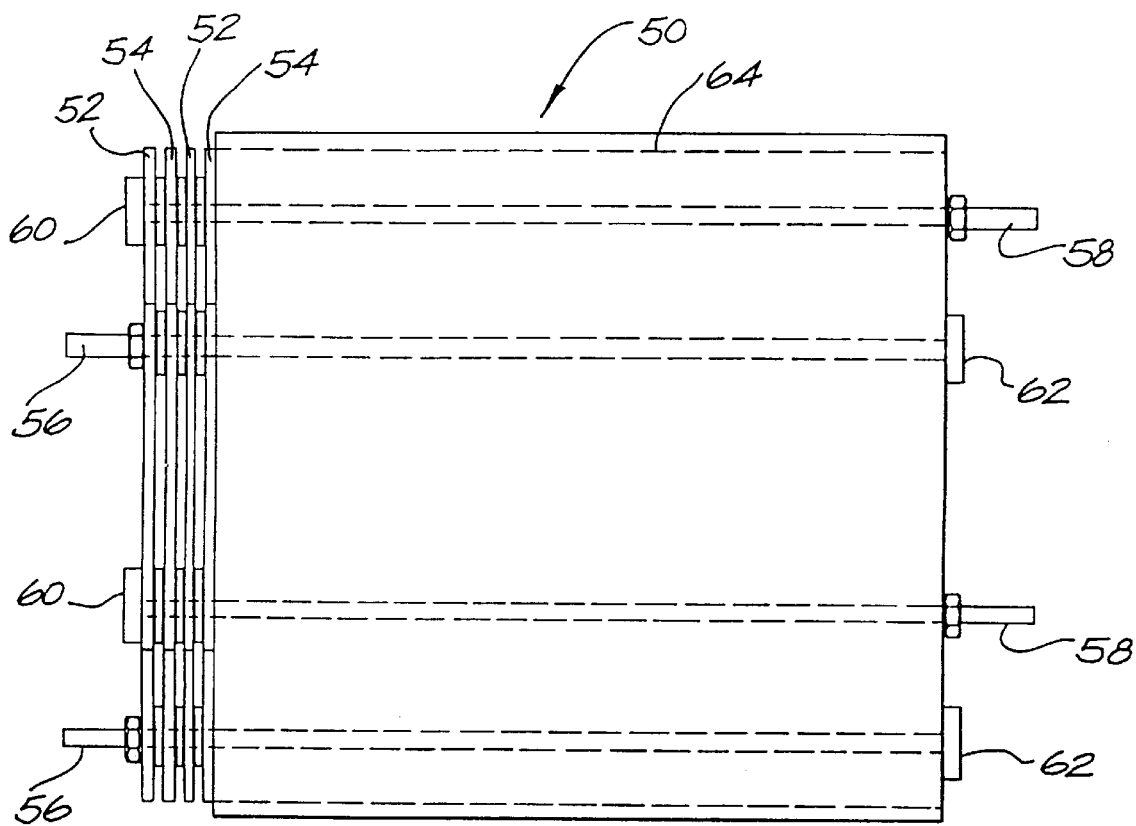
FIGS. 7a and 7b show the mechanical arrangement of a single cell stack in another embodiment.

FIG. 7a shows a partial cut-away side view of a cell unit 50 in accordance with another embodiment. The cell unit 50 is similar in configuration to that of FIG. 4 except for the number and shape of interconnecting spine members and the shape of the electrode plates.

Figure 7B:
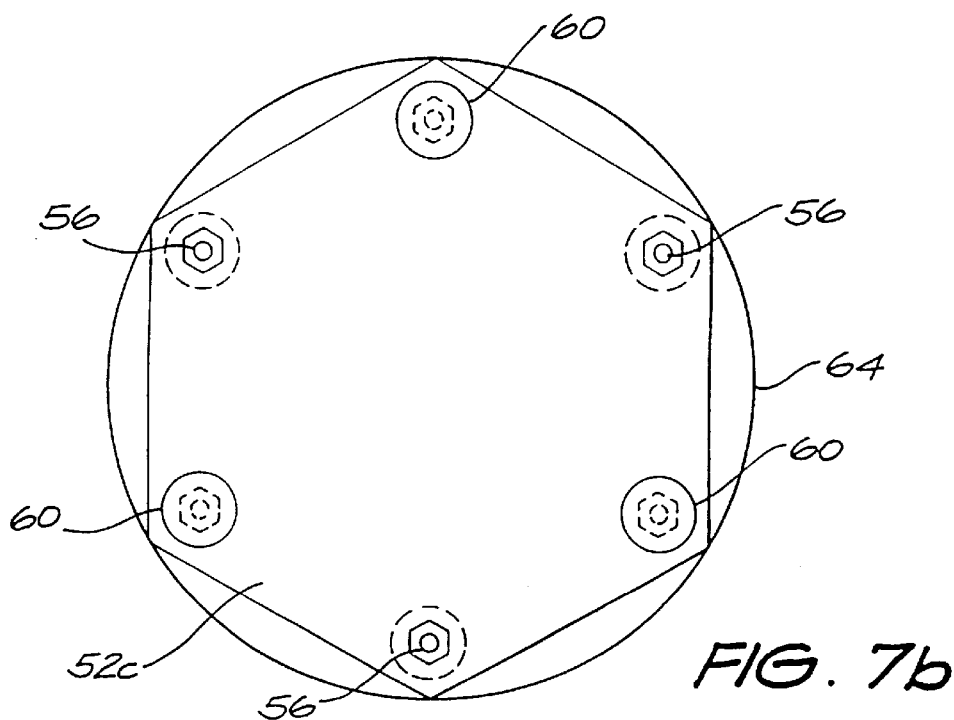

FIG. 7b shows an end view of the cell unit 50, and in particular the end-most plate 52c. The plate electrodes 52, 54 are hexagonal in shape. Each plate 52, 54 has six interconnecting rod-like spines 56, 58 passing therethrough, one near each vertice. Each alternate one of the spines 56 represents a common positive conductor and the other set of alternate spines 58 represents negative conductors. Each adjacent plate 52, 54 is electrically connected either to the positive conductors or the negative conductors. Spacing bushes 60 are provided between adjacent plates 52, 54 to provide electrical isolation and to provide a space in which the water and electrolyte circulates. Connection of each spine conductor 56, 58 to the respective plate electrode 52, 54 typically is by a threaded nut or interference fit. The reason for connecting each plate 52, 54 to three common spine conductors 56, 58 is to achieve a uniform current distribution across the whole surface area of a plate 52, 54.

As can be seen in FIG. 7b, the positive spine conductors 56 extend away from one end of the assembly for series interconnection with other arrangements of cells, as do three negative spine conductors 58 from the other end. All unconnected ends of the conductors are blanked-off with a non-conductive end cap 62.

Figure 8:
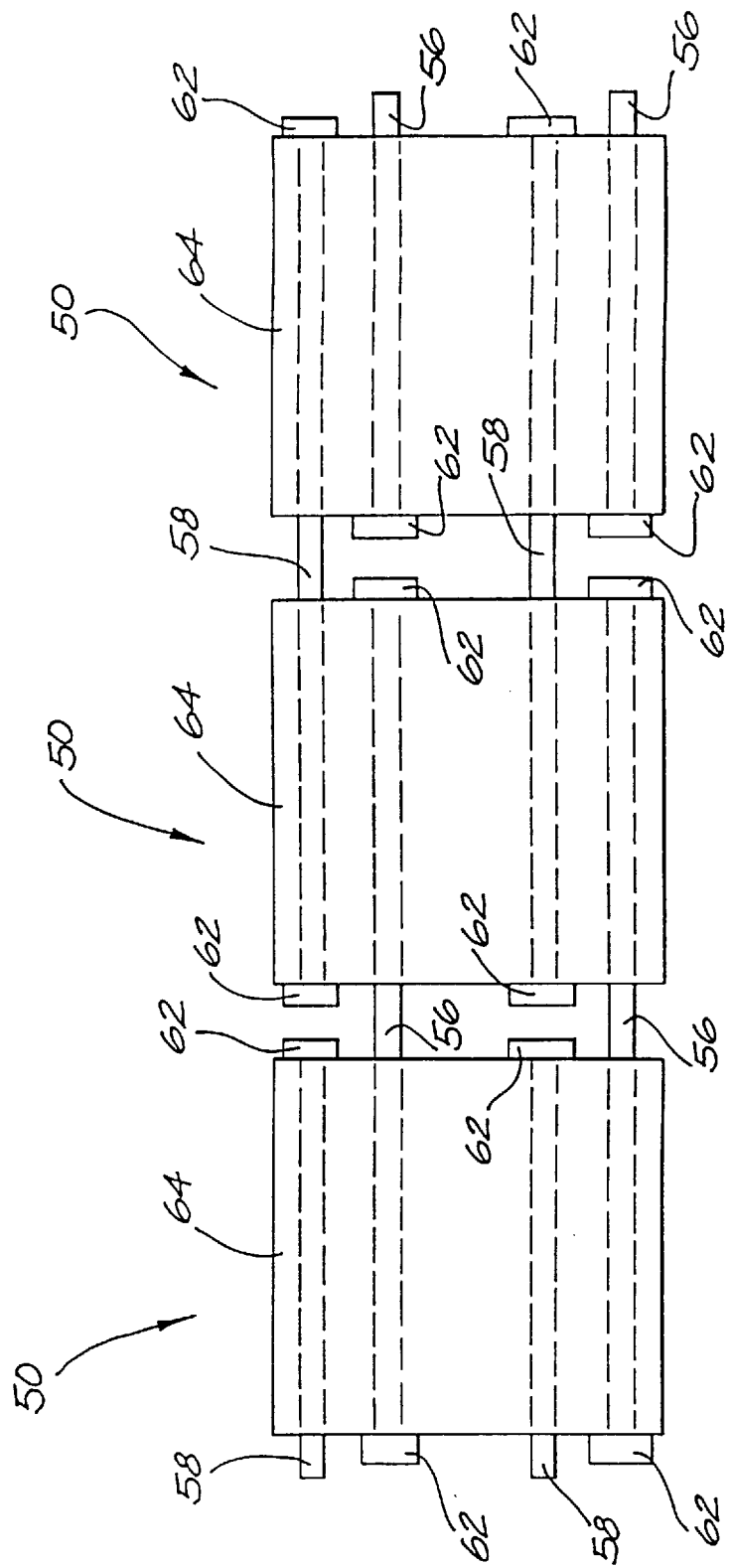
FIG. 8 shows the arrangement of a number of the cells shown in FIGS. 7a and 7b.

FIG. 8 shows a stylized form of three cell units 50 electrically connected in series (arranged longitudinally), and particularly the passage of the spine conductors 56, 58. The cell units 50 are enclosed within an insulating tube 64, typically made of PVC, which has an access for the communication of water to envelope the plates 52, 54 and for the generated gases to escape.

Figure 9:
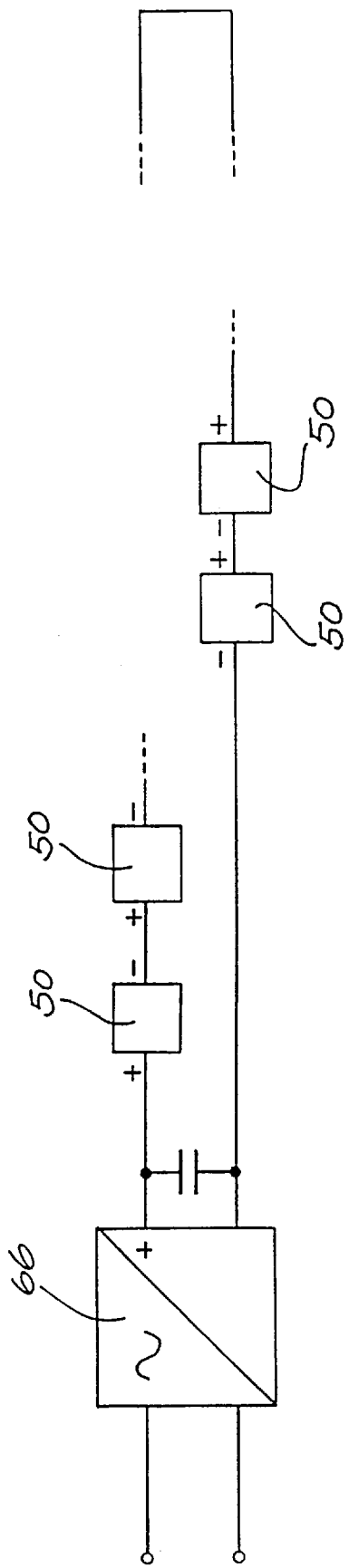
FIG. 9 shows the series electrical configuration of a number of cells in a cell bank.

FIG. 9 shows the series electrical interconnection of a number of cell units 50 directly connected with the DC output side of an AC/DC converter 66 (such as a simple diode bridge rectifier) without requiring a step-down transformer.

Figure 10A:
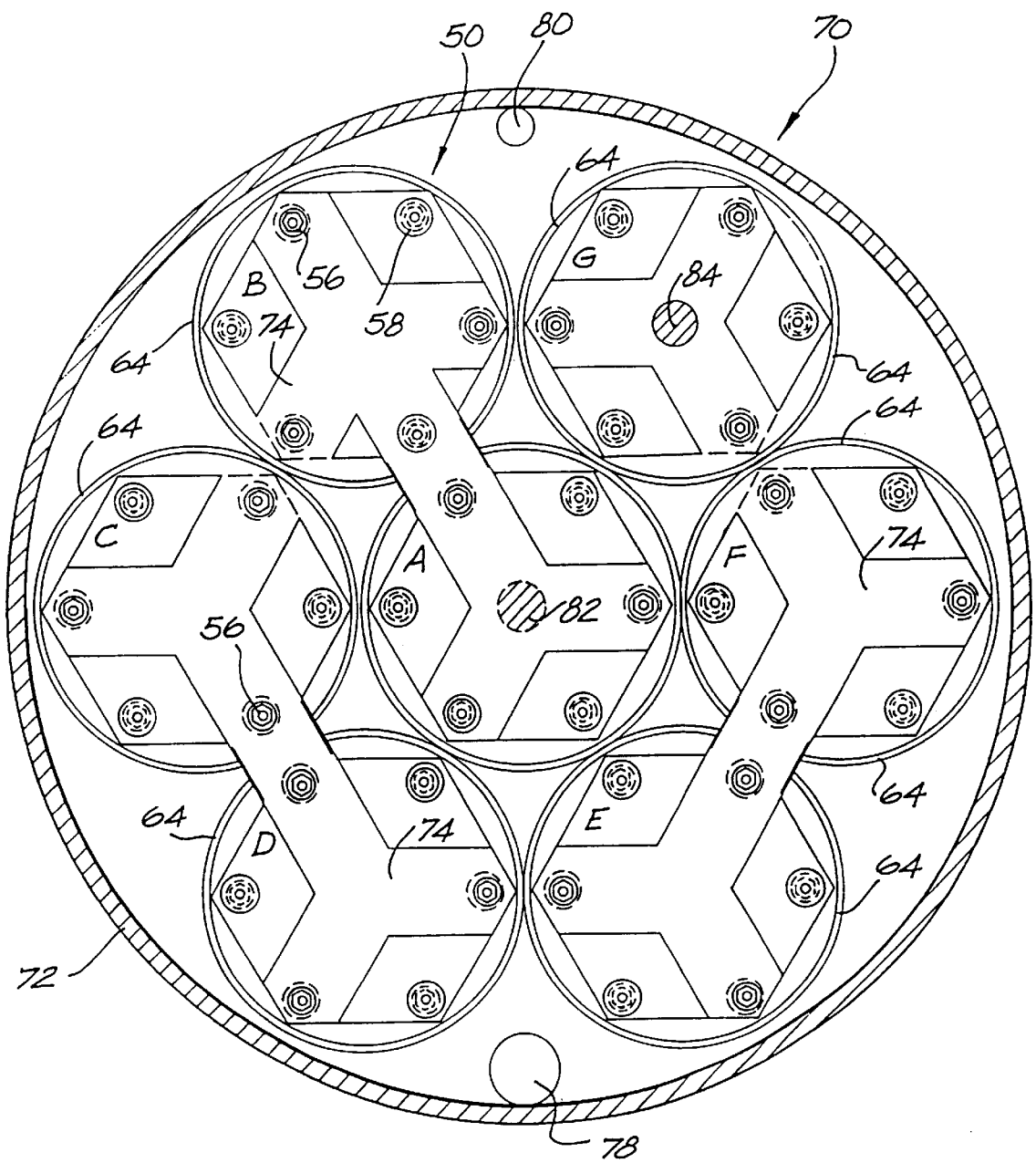
FIGS. 10a and 10b show the mechanical configuration of a cell bank assembly.
Figure 10B:
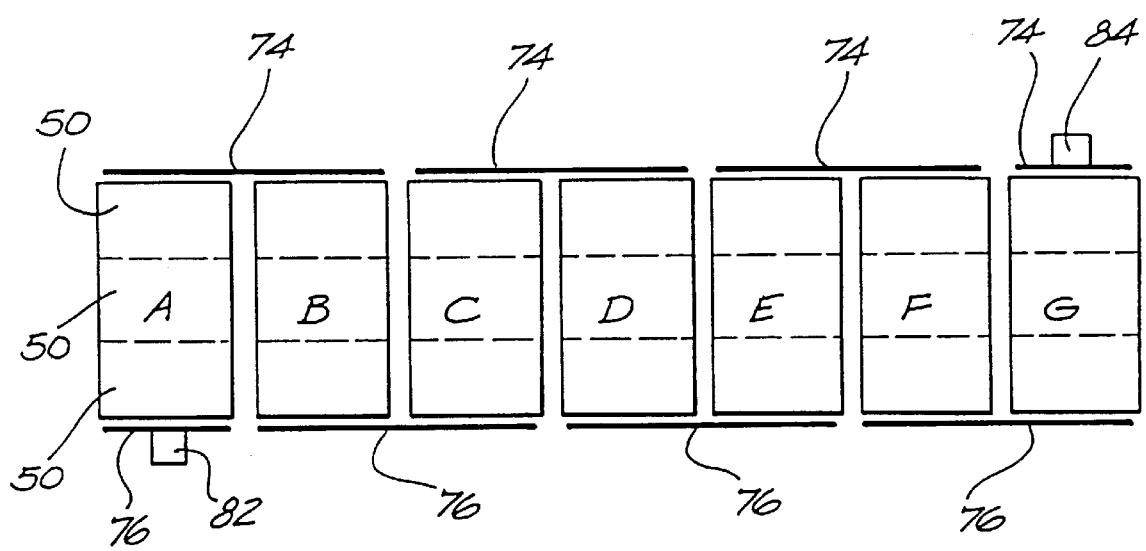

FIG. 10a shows an end view of the mechanical arrangement of seven assemblies (designated A–G), each consisting of three series connected cell units 50 (as shown in FIG. 8), forming a total cell arrangement 70. The cell assemblies 50 are located within a steel cylinder 72 containing the water and electrolyte required for the generation of the hydrogen and oxygen gases. Each group (A–G) of three cell units 50 is interconnected by means of a first group of steel connecting straps 74 at one end and a second group of steel connecting straps 76 (not shown) at the other end, arranged to be offset between the groups. While the first straps 74 alone are shown in FIG. 10a, both sets of the straps 74,76 are more clearly shown in FIG. 10b, which is a side view of the groups A–G when 'unravelled'.

The PVC tubes 64 shown in FIG. 10a insulate adjacent groups to avoid "short-circuiting" effects between one another. The cell arrangement 70 is very compact, and in a comparison with the prior art Brown arrangement is only one third of the physical size for a comparable gas volumetric flow rate. Moreover, there also being a similar reduction in total mass. The supply of water for the electrolysis process is provided by an inlet 78 located at the bottom of the cylinder 72, with the gases produced exit the cylinder 72 by an outlet 80 located at the top of the cylinder.

Electrical connection to a DC power supply is across the totality of the cells, and in the arrangement is at a central terminal 82 on the underside of cell A and a central terminal 84 on the top side of cell G, respectively.

FIGS. 11a and 12a show further embodiments of a first and second type of cell plate 90, 98 as an end view. FIGS. 11b and 12b are partial cross-sectional views along the respective mid-lines as shown. Common reference numerals have been used where appropriate. The plates 90, 98 can have the function of either an anode (+) or a cathode (−), as will become apparent. Each comprises an electrode disc 92 that is perforated with hexagonally shaped holes 96. The disc 92 is made from steel or resin-bonded carbon or conductive polymer material. The disc 92 is housed in a circular rim or sleeve 94. The function of the perforations 96 is to maximize the surface area of the electrode disc 92 and minimize the weight over solid constructions by 45%.

By way of example, for a disc having diameter of 280 mm, the thickness of the disc must be 1 mm in order to allow the current density (which ranges from 90 A/2,650 $cm^2$–100 A/2,940 $cm^2$ of the anode or cathode) to be optimal. If the diameter of the plate is increased, which consequently increases the surface area, it is necessary to increase the thickness of the plate in order to maintain uniformity of conductance for the desired current density.

The hexagonal perforations in a 1 mm thick disc have a distance of 2 mm between the flat portions of the plates and are 1 mm away from the next adjacent perforation, in order to maintain the same total surface area prior to perforation, and to allow the current density to be optimal. A 1 mm (plate to plate) distance between the adjacent hexagonal perforations is required because a smaller distance will result in thermal (resistive) losses and a larger distance will add to the overall weight of the plate.

The sleeve 94 is constructed of PVC material and incorporates a number of equally spaced shaft holes 100, 102. The holes are for the passage of interconnecting shafts provided in a stacked arrangement of the plates 90, 98 forming the common conductor for the respective anode and cathode plates, much in the nature of the arrangement shown in FIGS. 7a and 7b. The additional two upper holes 104, 106 each support a conduit respectively for the out-flow of oxygen and hydrogen gases, respectively. The additional holes 108, 110 at the bottom of the sleeve 94 are provided for the inlet of water and electrolyte to the respective cell plates 90, 98.

Figure 13:
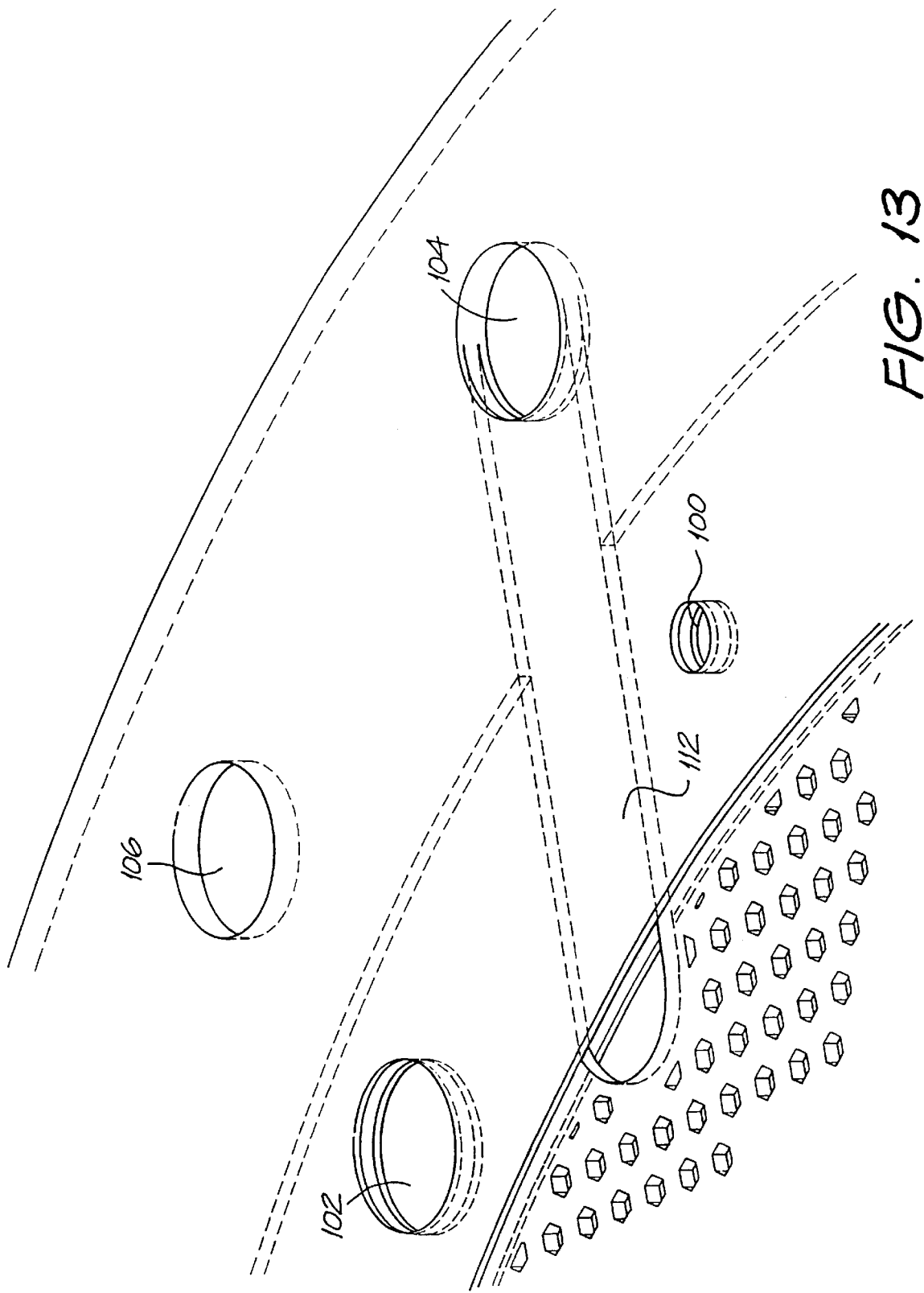
FIG. 13 shows detail of the perforations and porting of the cell plates of FIGS. 11a, 11b, 12a and 12b.

FIG. 13 shows an enlarged view of a portion of the cell plate 90 shown in FIG. 11a. The port hole 104 is connected to the hexagonal perforations 96 within the sleeve 94 by an internal channel 112. A similar arrangement is in place for the other port hole 106, and for the water/electrolyte supply holes 108, 110.

If the hydrogen and oxygen gases liberated are to be kept separate (i.e. not to be formed as an admixture), then it is necessary to separate those gases as they are produced. In the prior art, this is achieved by use of diaphragms that block the passage of gases and effectively isolate the water/electrolyte on each side of the diaphragm. Ionic transfer thus is facilitated by the ionically conductive nature of the diaphragm material (i.e. a water—diaphragm—water path). This results in an increase in the ionic resistance, and hence, a reduction in efficiency. Prior art patent No. 487062 describes another arrangement (see FIG. 6 thereof) that utilizes magnets to cause the separation of the gases.

Figure 14:
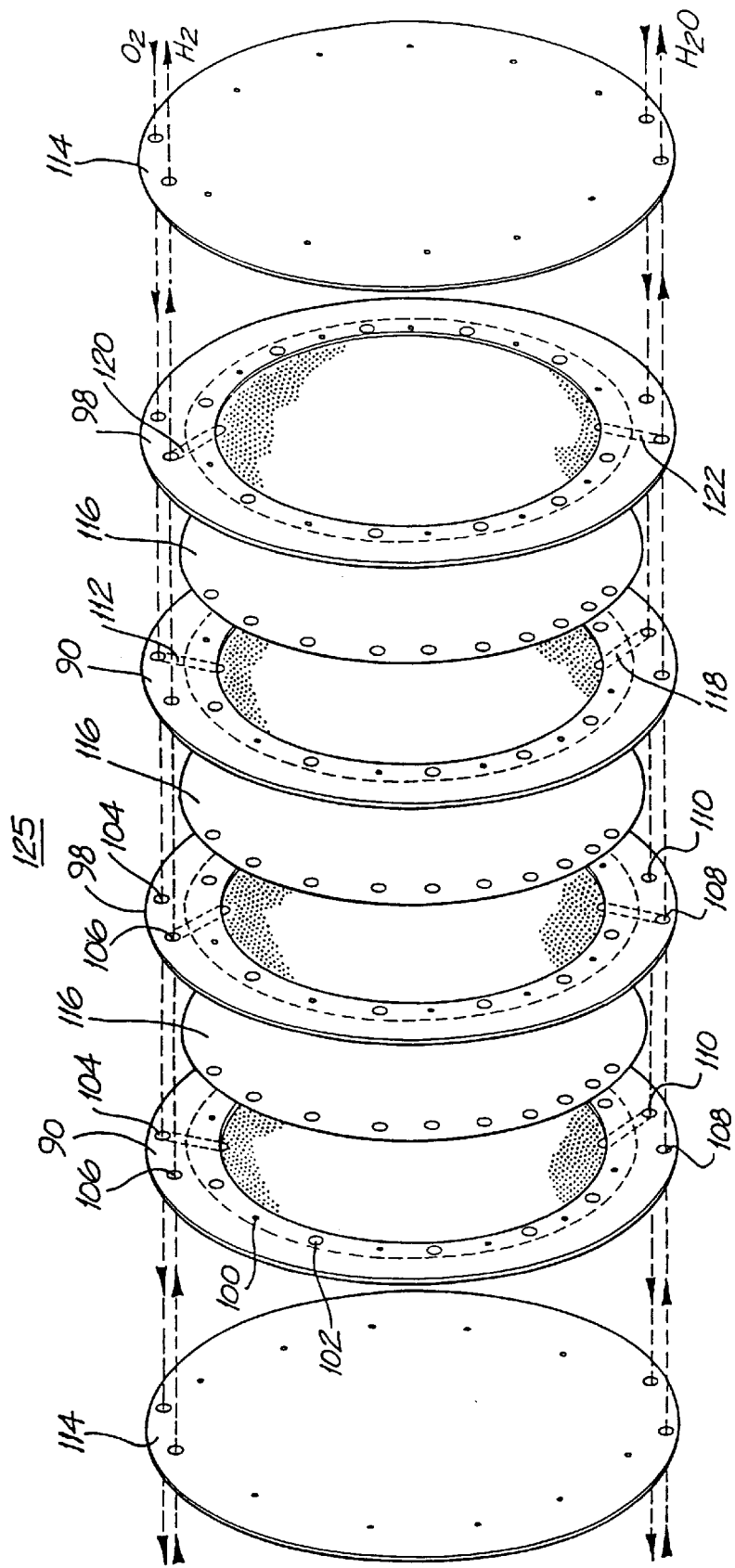
FIG. 14 shows an exploded stacked arrangement of the cell plates of FIGS. 11a, 11b, 12a and 12b.

FIG. 14 shows an exploded stacked arrangement of four cell plates, being an alternative stacking of two (anode) cell plates 90 and two (cathode) cell plates 98. The two ends of the stacked arrangement of cell plates delineates a single cell unit 125. Interposed between each adjacent cell plate 90, 98 is a PTFE separation 116. Although not shown in FIG. 14, the cell unit includes separate hydrogen and oxygen gas conduits that respectively pass through the stacked arrangement of cell plates via the port holes 106, 104 respectively. In a similar way, conduits are provided for the supply of water/electrolyte, respectively passing through the holes 108, 110 at the bottom of the respective plates 90, 98.

Only two pairs of anode/cathode cell plates are shown. The number of such plates can be greatly increased per cell unit 125.

Also not shown are the interconnecting conductive shafts that electrically interconnect alternate common cell plates. The reason for having a large diameter hole in one cell plate adjacent to a smaller diameter hole in the next cell plate, is so that an interconnecting shaft will pass through the larger diameter hole, and not make an electrical connection (i.e. insulated with PVC tubing) but rather only form an electrical connection between alternate (common) cell plates.

The cell unit 125 shown in FIG. 14 arrangement is an exploded view. When fully constructed, all the elements are stacked to be in intimate contact. Mechanical fastening is achieved by use of one of two adhesives such as (a) "PUR-FECT LOK" (TM) 34-9002, which is a Urethane Reactive Hot Melt adhesive with a main ingredient of Methylene Bispheny/Dirsocynate (MDI), and (b) "MY-T-BOND" (TM) which is a PVC solvent based adhesive. Both adhesives are Sodium Hyroxide (20% present in the electrolyte) resistant. In that case, the water/electrolyte only resides within the area proscribed by the cell plate sleeve 94. Thus the only path for the inlet of water/electrolyte is by bottom channels 118, 122 and the only outlet for the gases is the top channels 112,120. In a system constructed and tested by the inventor, the thickness of the cell plates 90, 98 is 1 mm (2 mm on the rim because of the PVC sleeve 94), with a diameter of 336 mm. The cell unit 125 is segmented from the next cell by an insulating PVC segmentation disc 114. A segmentation disc 114 is also placed at the beginning and end of the entire cell bank.

If there is to be no control over separation of the liberated gases, then the PTFE membranes 116 are not needed.

The PTFE membrane 116 is fibrous and has 0.2 to 1.0 micron interstices. A suitable type is type Catalogue Code J, supplied by Tokyo Roshi International Inc (Advantec). The water/electrolyte fills the interstices and ionic current flows only via the water—there is no contribution of ionic flow through the PTFE material itself. This leads to a reduction in the resistance to ionic flow. The PTFE material also has a "bubble point" that is a function of pressure. Hence by controlling the relative pressures at either side of the PTFE separation sheets, the gases can be "forced" through the interstices to form an admixture, or otherwise kept separate. Other advantages of this arrangement include a cheaper cost of construction, improved operational efficiency and greater resistance to faults.

Figure 15A:
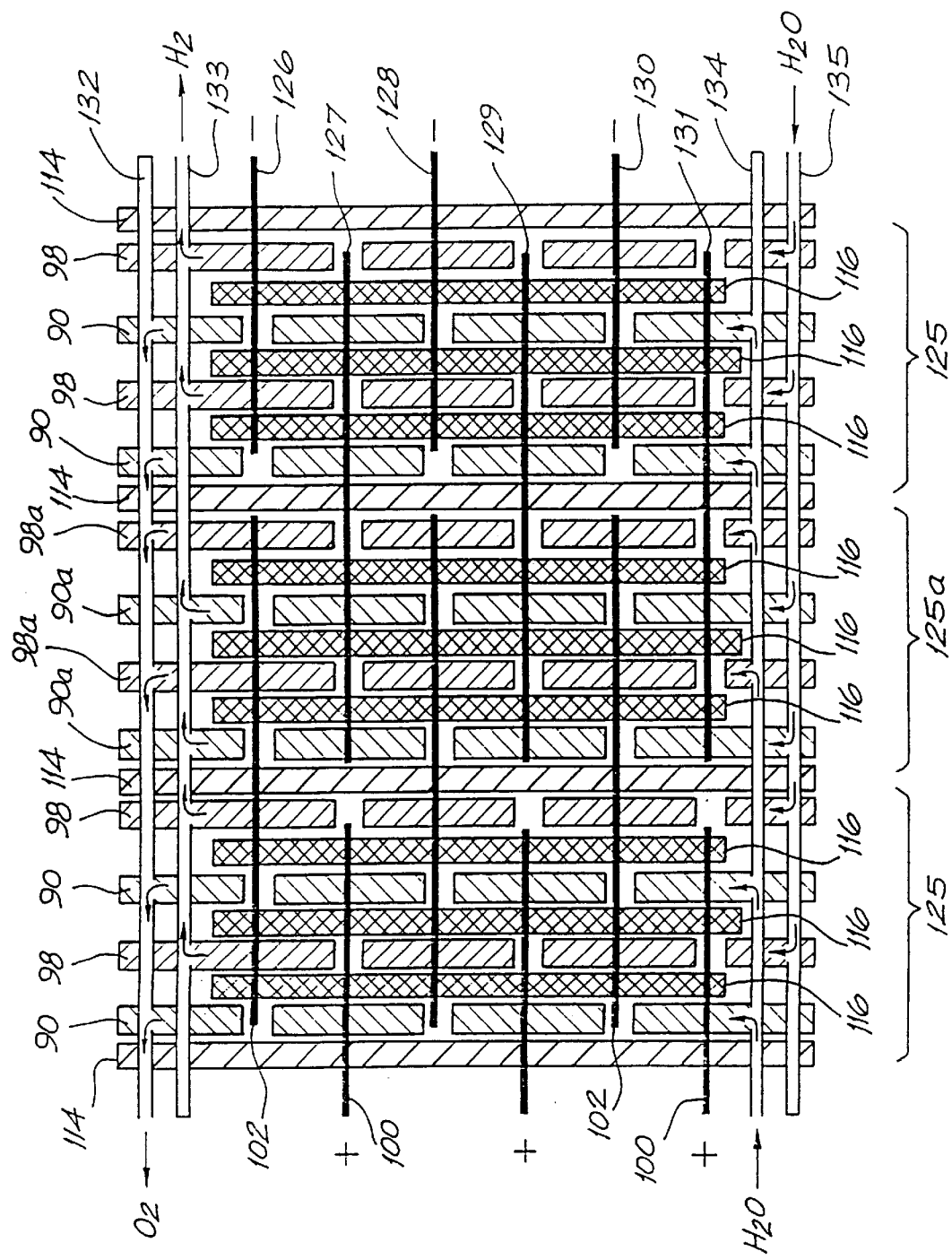
FIG. 15a shows a schematic view of the gas separation system of FIG. 14.

FIG. 15a is a stylized and exploded, schematic view of a linear array of three series-connected cell units 125. For clarity, only six interconnecting shafts 126–131 are shown. The shafts 126–131 pass through the respective shaft holes 102, 100 in the various cell plates 90, 98 in the stacked arrangement. The polarity attached to each of the exposed end shafts, to which the DC supply is connected also is indicated. The shafts 126–131 do not run the full length of the three cell banks 125. The representation is similar to the arrangement shown in FIGS. 7a and 8. One third of the full DC source voltage appears across each anode/cathode cell plate pair 90, 98.

Further, the gas conduits 132, 133, respectively for oxygen and hydrogen, that pass through the port holes 104, 106 in the cell plates 90, 98 also are shown. In a similar way, water/electrolyte conduits 134, 135, passing through the water port holes 108, 110 in the cell plates also are shown.

Figure 15B:
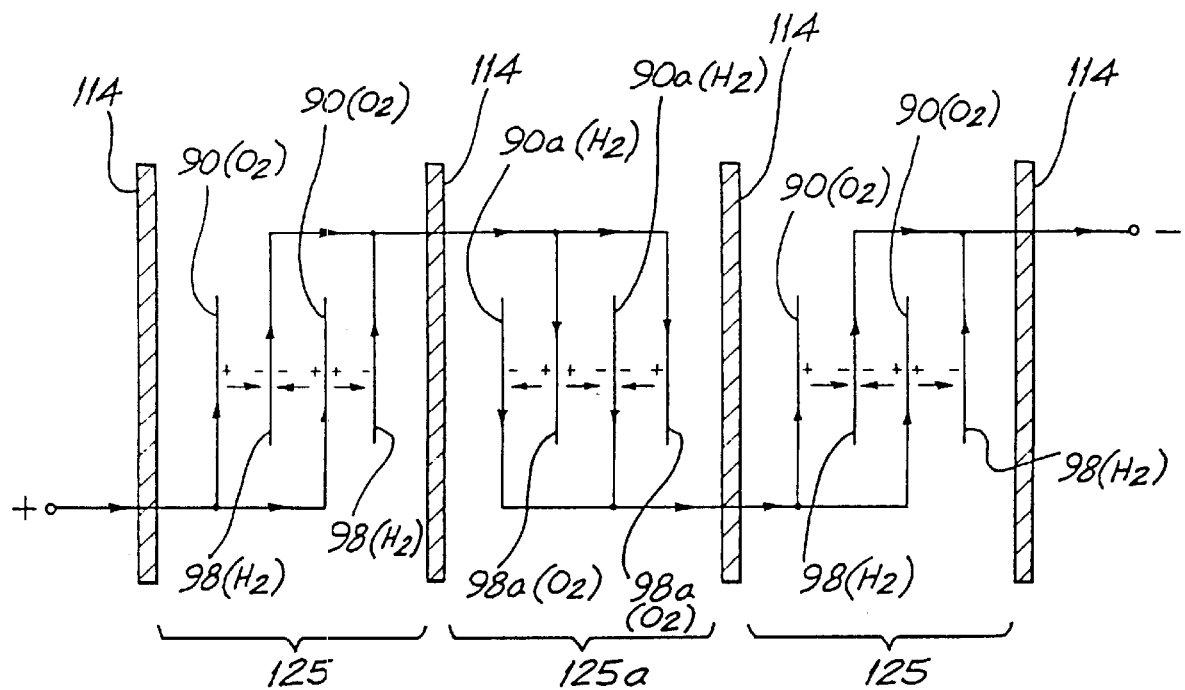
Figure 15C:
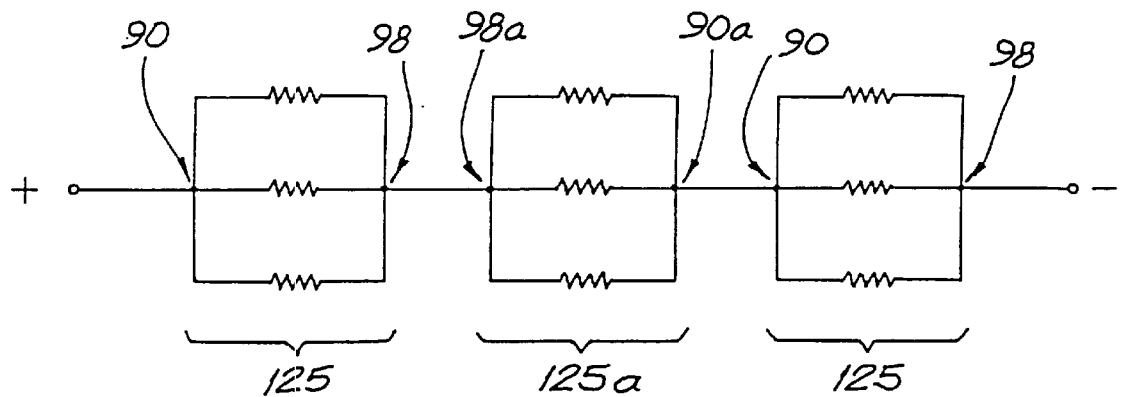

FIG. 15b particularly shows how the relative potential difference in the middle cell bank 125a changes. That is, the plate electrode 90a now functions as a cathode (i.e. relatively more negative) to generate hydrogen, and the plate electrode 98a now functions as an anode (i.e. relatively more positive) to generate oxygen. This is the case for every alternate cell unit. The arrowheads shown in FIG. 15b indicate the electron and ionic current circuit. FIG. 15c is an electrical equivalent circuit representation of FIG. 15b, where the resistive elements represent the ionic resistance between adjacent anode/cathode plates. Thus, it can be seen that the cell units are connected in series.

Because of the change of function of the cell plates 90a and 98a, the complementary gases are liberated at each. Hence, the respective channels 112 are connected to the opposite gas conduit 132,133. Practically, this can be achieved by the simple reversal of the cell plates 90, 98.

Figure 16:
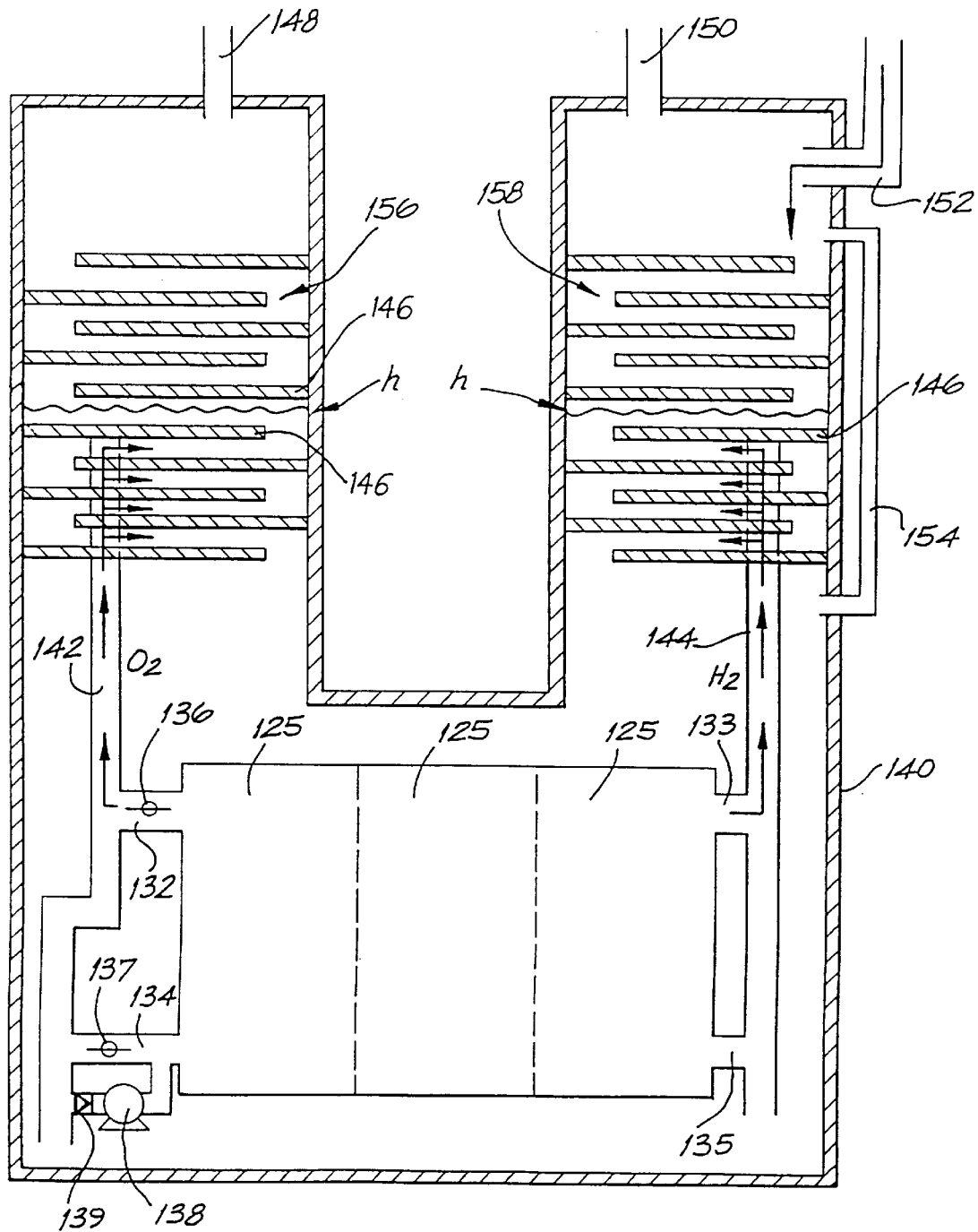

FIG. 16 shows the three cell units 125 of FIG. 15a connected to a gas collection arrangement. The cell units 125 are located within a tank 140 that is filled with water/electrolyte to the level h indicated. The water is consumed as the electrolysis process proceeds, and replenishing supply is provided via the inlet 152. The water/electrolyte level h can be viewed via the sight glass 154. In normal operation, the different streams of oxygen and hydrogen are produced and passed from the cell units 125 to respective rising columns 142,144. That is, the pressure of electrolyte on opposed sides of the PTFE membranes 116 is equalized. Thus, the gases cannot admix.

The columns 142, 144 also are filled with the water/electrolyte, and as it is consumed at the electrode plates, replenishing supply of electrolyte is provided by way of circulation through the water/electrolyte conduits 134, 135. The circulation is caused by entrainment by the liberated gases, and by the circulatory inducing nature of the conduits and columns.

The upper extent of the tank 140 forms two scrubbing towers 156, 158, respectively for the collection of oxygen and hydrogen gases. The gases pass up respective columns 142, 144, and out from the columns via openings therein at a point within the interleaved baffles 146. The point where the gases exit the columns 142, 144 is beneath the water level h, which serves to settle any turbulent flow and entrained electrolyte. The baffles 146 located above the level h scrub the gas of any entrained electrolyte, and the scrubbed gas then exits by respective gas outlet columns 148, 150 and so to a gas receiver. The level h within the tank 140 can be regulated by any convenient means, including a float switch, and with the replenishing water supplied by the inlet pipe 152.

The liberated gases will always separate from the water/electrolyte solution by virtue of the difference in densities. Because of the relative height of the respective set of baffles, and due to the density differential between the gases and the water/electrolyte, it is not possible for the liberated hydrogen and oxygen gases to mix. The presence of the full volume of water within the tank 140 maintains the cell plates in an immersed state, and further serves to absorb the shock of any internal detonations should they occur.

In the event that a gas admixture is required, then, firstly, the two flow valves 136, 137 respectively located in the oxygen gas outlet conduit 132 and water/electrolyte inlet port 134 are closed. This blocks the outlet path for the oxygen gas and forces the inlet water/electrolyte to pass to the inlet conduit 134 via a one-way check valve 139 and pump 138. The water/electrolyte within the tank 140 is under pressure by virtue of its depth (volume), and the pump 138 operates to increase the pressure of water/electrolyte occurring about the anode cell plates 90, 98a to be at an increased pressure with respect to the water/electrolyte on the other side of the membrane 116. This pressure differential is sufficient to cause the oxygen gas to migrate through the membrane. Thus, admixed oxygen and hydrogen are liberated via the gas output conduit 133 and column 144. Since there is no return path for the water/electrolyte supplied by the pump 138, the pressure about the cell plates 90, 98a will increase further, and to a point where the difference is sufficient such that the water/electrolyte also can pass through the membrane 116. Typically, pressure differential in the range of 1.5–10 psi is required to allow passage of gas, and a pressure differential in the range of 10–40 psi for water/electrolyte.

While only three cell units 125 are shown, clearly any number, connected in series, can be implemented.

Figure 17:
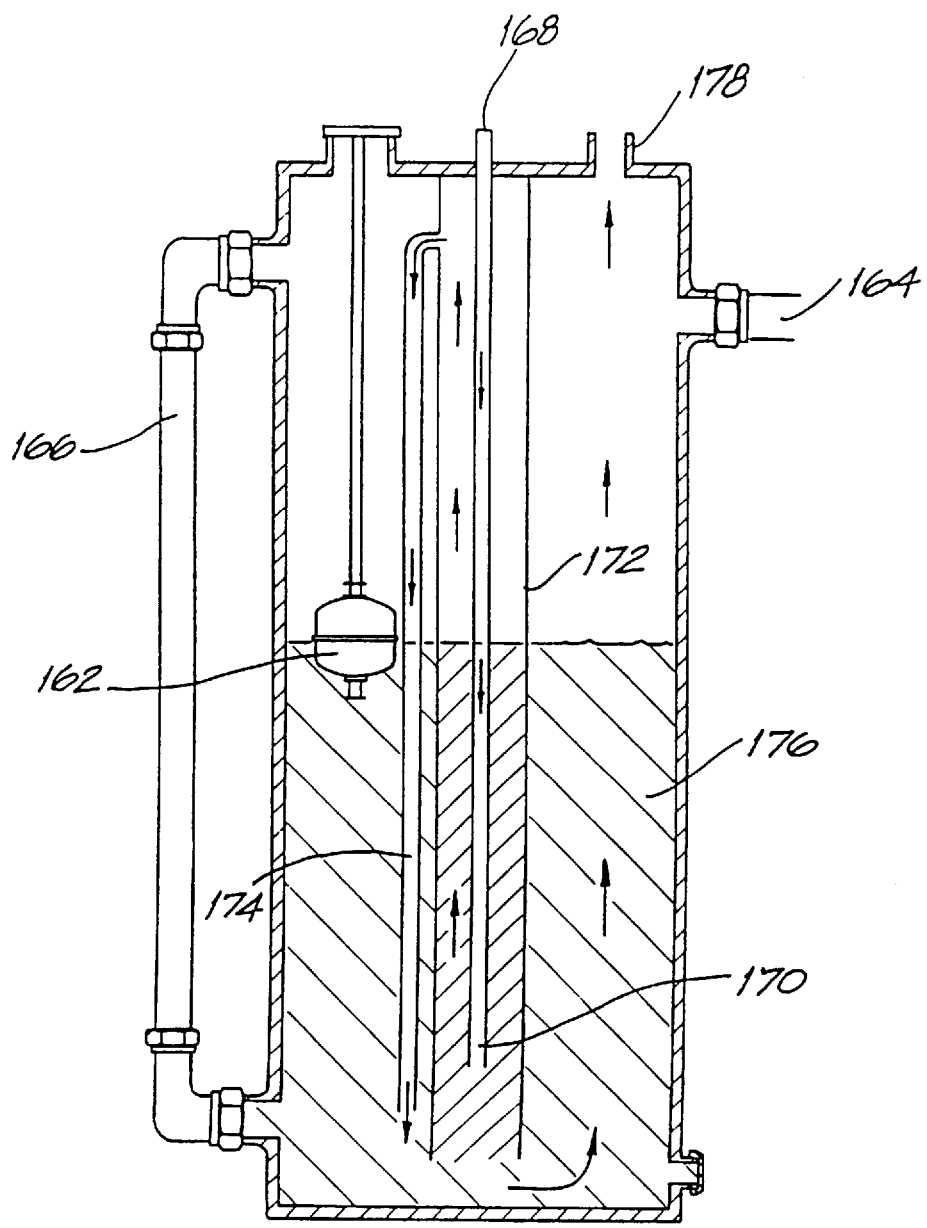
FIG. 17 shows, as a cross-sectional view, a hydraulic scrubber and check valve.

FIG. 17 shows another embodiment of a check valve and scrubber unit 160 for scrubbing liberated gas(es) before subsequent use. The unit 160 is filled with water, typically to a level being about half the full height of the unit. The level is regulated by a float switch 162. Water is supplied by means of the inlet 164. A sight column 166 is also provided, which serves to give a visual indication of the water level.

The hydrogen and/or oxygen gases from the gas receiver, now under pressure, enter by an entry tube 168 having an opening 170 at the bottom end thereof. The gases travel down the tube 168 and out of the opening 170 to bubble upwardly on the inside of the inner column 172, which also is filled with the supplied water, thus performing a first scrubbing action to remove the sodium hydroxide electrolyte. The gas then enters another downwardly directed tube 174 and out the opened end thereof, passing again through the water in the outer chamber 176 to be further scrubbed. The gas is to be stored under pressure within the space above the water level and be available for supply from the outlet 178.

Admixed hydrogen and oxygen gases supplied from the output 178 to, for example, a welding tip (not shown) are in the correct stoichiometric proportions as a result of the electrolysis process, and ensures that, on combustion, a neutral flame is produced. The only products of the combustion process are heat and water vapour.

If the gases are produced separately, two check-valve scrubbers 160 are employed, the gases can then be mixed in a mixing chamber which also will produce the correct stoichiometric mix.

If there is an explosion which backs-up through the outlet 178 from a welding tip, it will be quenched by the water within the unit 160. The energy of the explosion will be absorbed by displacing the water in both the outer chamber 176 and the inner column 172. This displacement also cuts off the flow of inlet gas to the tube 168. In this way, there will be no possibility of the explosion further propagating towards an electrolysis cell bank producing the gases. The water within the unit 160 therefore acts both as a gas scrubber and also as a check valve.

Figure 18:
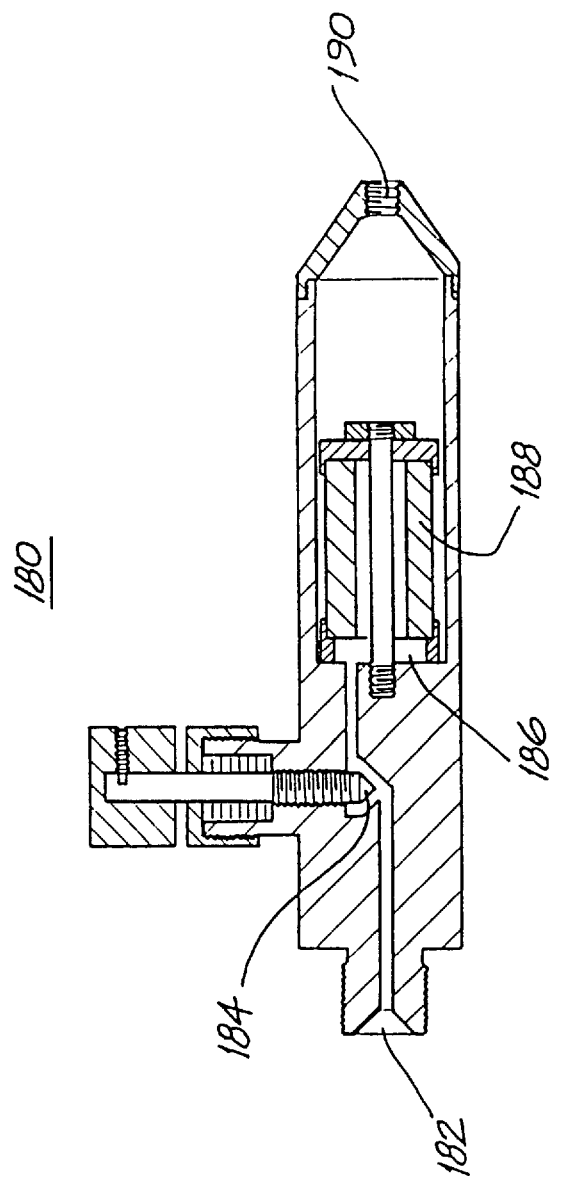
FIG. 18 shows, as a cross-sectional view, a welding tip of FIG. 10 including a flashback arrester.

FIG. 18 shows a welding tip 180 in cross-sectional detail. The hydrogen and oxygen gases are received along an inlet tube 182, passing by a needle valve 184 and into an expansion chamber 186. The expansion chamber 186 includes a flashback control apparatus, which comprises a cylindrically arranged flashback arrester 188, typically formed of 5 micrometer stainless steel meshing. In normal operation, the gases flow through the flashback arrester 188 and to the outlet or nozzle 190, where combustion, or gas ionisation during the production of plasma, takes place.

In the event that flashback occurs, the flashback arrester 188 disallows further rearward passage of the flame, which cannot physically pass through openings as small as, for example, 5 micrometers. This is coupled with a heat sink effect of the material from which the arrester 188 is constructed which operates to dissipate the energy of the flame, and thus, assist in extinguishing the flame.

The use of hydrogen and/or oxygen in welding and cutting by electrolysis allows temperatures of the order of 6000° C. to be achieved with the ability to produce gas on demand. No gas stored in bottle form is required. It is further possible to conduct fine flame welding with a high purity of gas, and also to be able to fuse ceramic materials.

All of the following materials can be welded: carbon steel, cast iron, stainless steel, aluminium, brazing, silver soldering, copper and ceramics. The following ferrous and non-ferrous materials, due to the available production of pure hydrogen subsequently passed through a DC arc providing a hydrogen plasma stream ($H_2 \rightarrow H_1$), can be readily cut: carbon steel, cast iron, stainless steel, aluminium, brazing and copper.

The embodiment of the invention can provide a continuous supply of hydrogen gas at large flow rates. As such, it is well disposed to applications that consume large quantities of hydrogen. An example of one such process is the Plascon (TM) waste destruction process developed by the Australian CSIRO's Division of Manufacturing Technology. A summary of the Plascon process can be found in the CSIRO Journal "Ecos, Volume 68, Winter 1991".

One application of the hydrogen and oxygen gases produced by the apparatus described above is in the thermal destruction of waste, and without the consumption of atmospheric oxygen. This procedure requires an on-demand supply of hydrogen and oxygen gas. The electrolysis apparatus described above can, in a scaled-up version, produce the requisite gas flow rates in order to combust waste gases on a commercial scale.

Figure 19A:
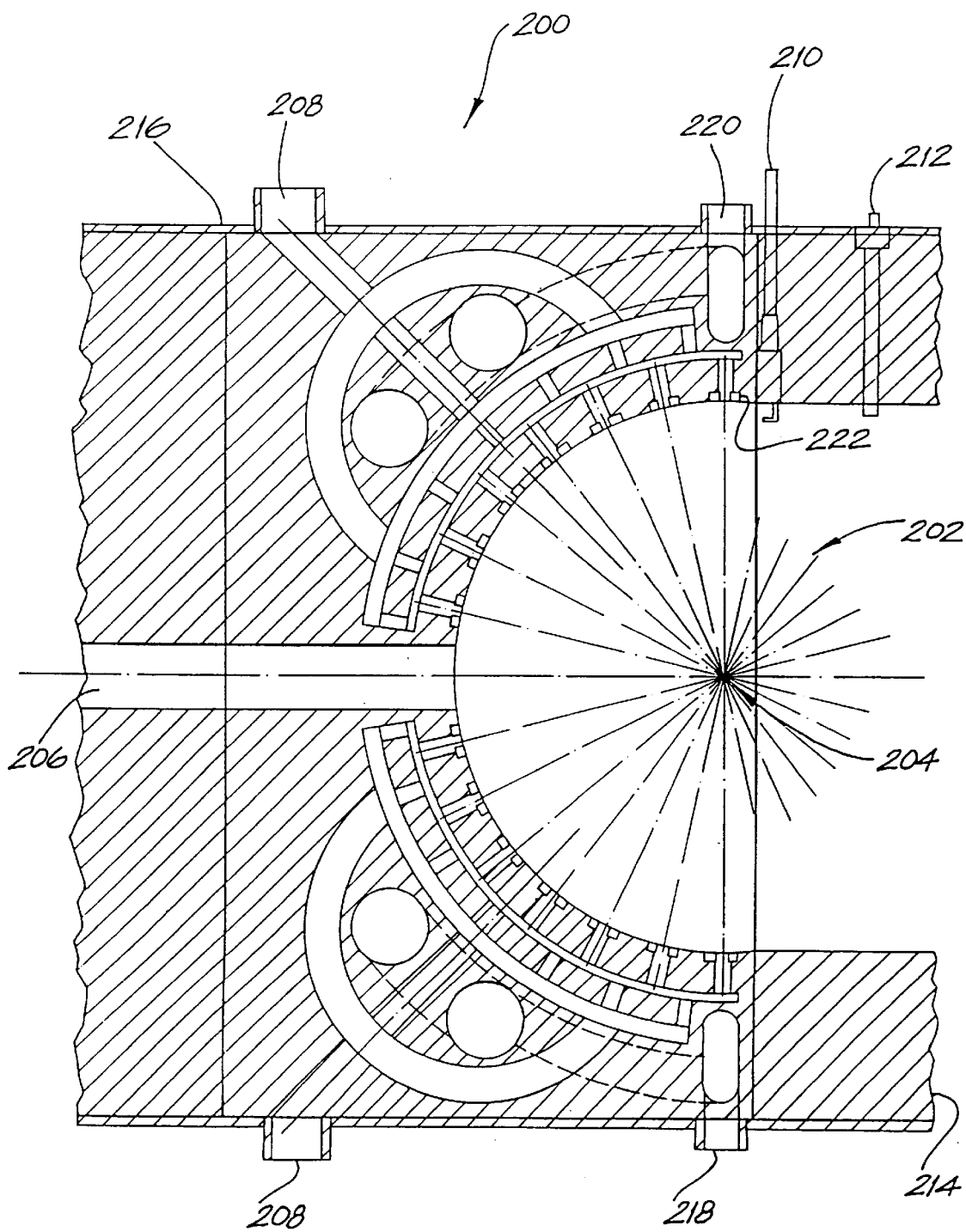
FIGS. 19a and 19b show a burner for the destructive combustion of pollutants.
Figure 19B:
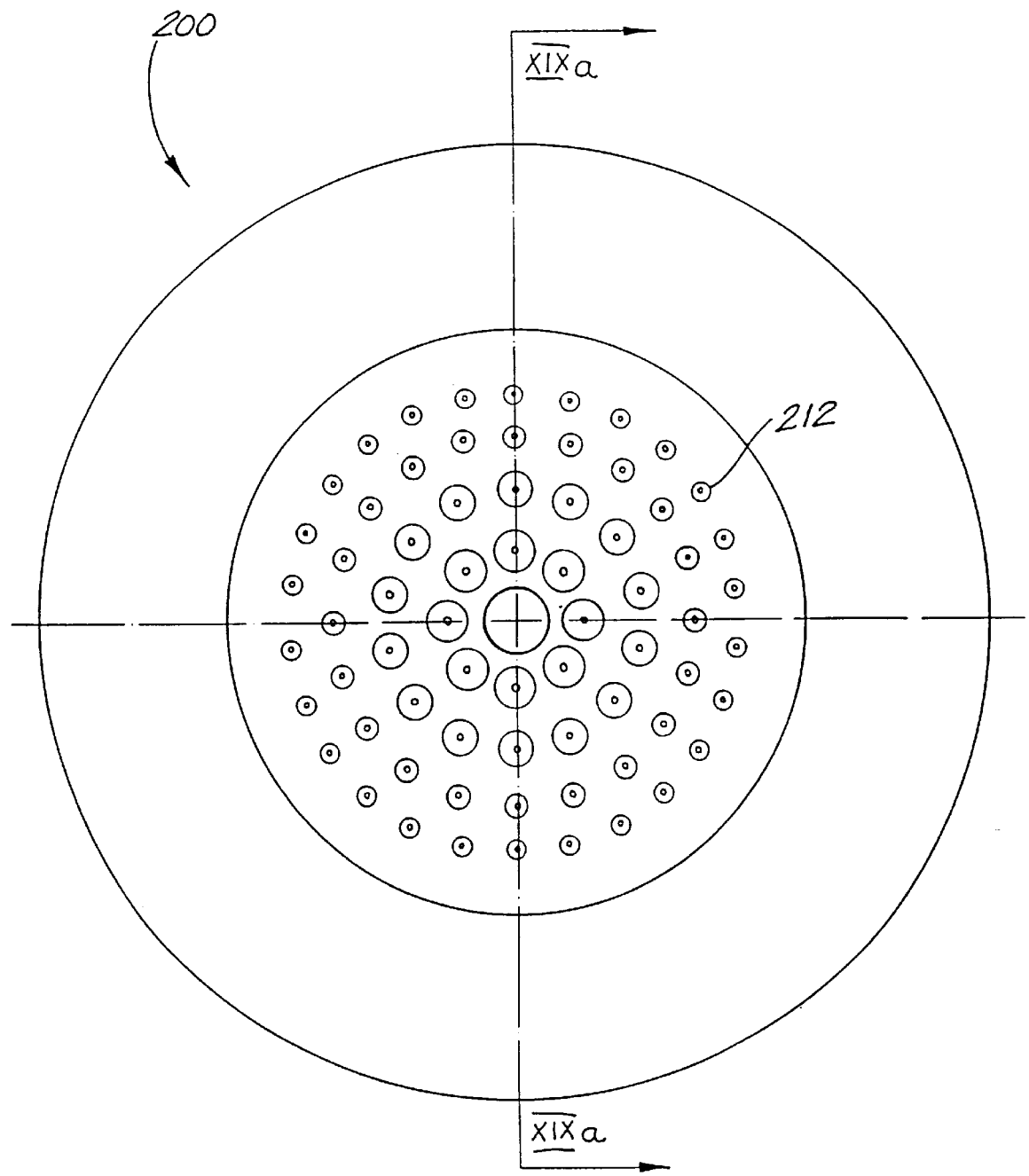

FIGS. 19a and 19b show a configuration for a burner used in the destruction of such gaseous polluting emissions. FIG. 19a shows a cross-sectional view of a burner 200. The cross-sectional view along the mid-line is shown in FIG. 19b. The burner 200 has a combustion chamber 202 that is hemispherical in shape. The emissions, which may include a mixture of fumes containing hydrocarbons and other volatile pollutants as a waste product of industrial processes, are injected to the combustion chamber by an inlet path 206. There are two sources of an admixture of gaseous hydrogen and oxygen in stoichiometric proportions of 2:1, one each to an upper and lower quadrant of the combustion chamber 202. These gases are supplied by the two gas inlets 208 at points diametrically opposed on the sides of the burner 200. The mixture of hydrogen and oxygen and emissions formed within the combustion chamber 202 is ignited by means of a spark plug 210, or the like, and burns at a temperature of not less than 4000° C., thus providing energy for molecular disassociation of all the pollutants into harmless compounds that can be discharged to the atmosphere. No atmospheric oxygen is consumed in the burning process. Complete combustion of the pollutants is aided by the "focusing" effect of the combustion chamber 202, which further improves the mixing of the gas streams.

A thermocouple 212 measures the temperature within the silicone fiber refractory heat insulatory material 214 surrounding the combustion chamber 202. The cladding 216 applied to the burner 200 is typically made of stainless steel.

The burner configuration is formed by seven (only four are shown) concentrically arranged sets of nozzles 212, as is clearly shown in FIG. 19b. The nozzles 222 are directed to commonly intersect at the epicenter 204 of the combustion chamber 202. The cooling water, supplied by an inlet 218 and exiting by an outlet 220, is intended to maintain the nozzles 222 at a temperature of less than 300° C. Above 300° C., hydroxy gas has the tendency to "back burn".

The flow path of hydrogen and oxygen gases to the nozzles 222 from the inlets 208 has four 90° (minimum) correction changes. This is intended to slow the linear momentum of the hydroxy flame in the event of a flashback, and so cause the flame to self-extinguish. This is particularly advantageous, as hydrogen burns at a rate of 3,600 m/s.

Figure 20:
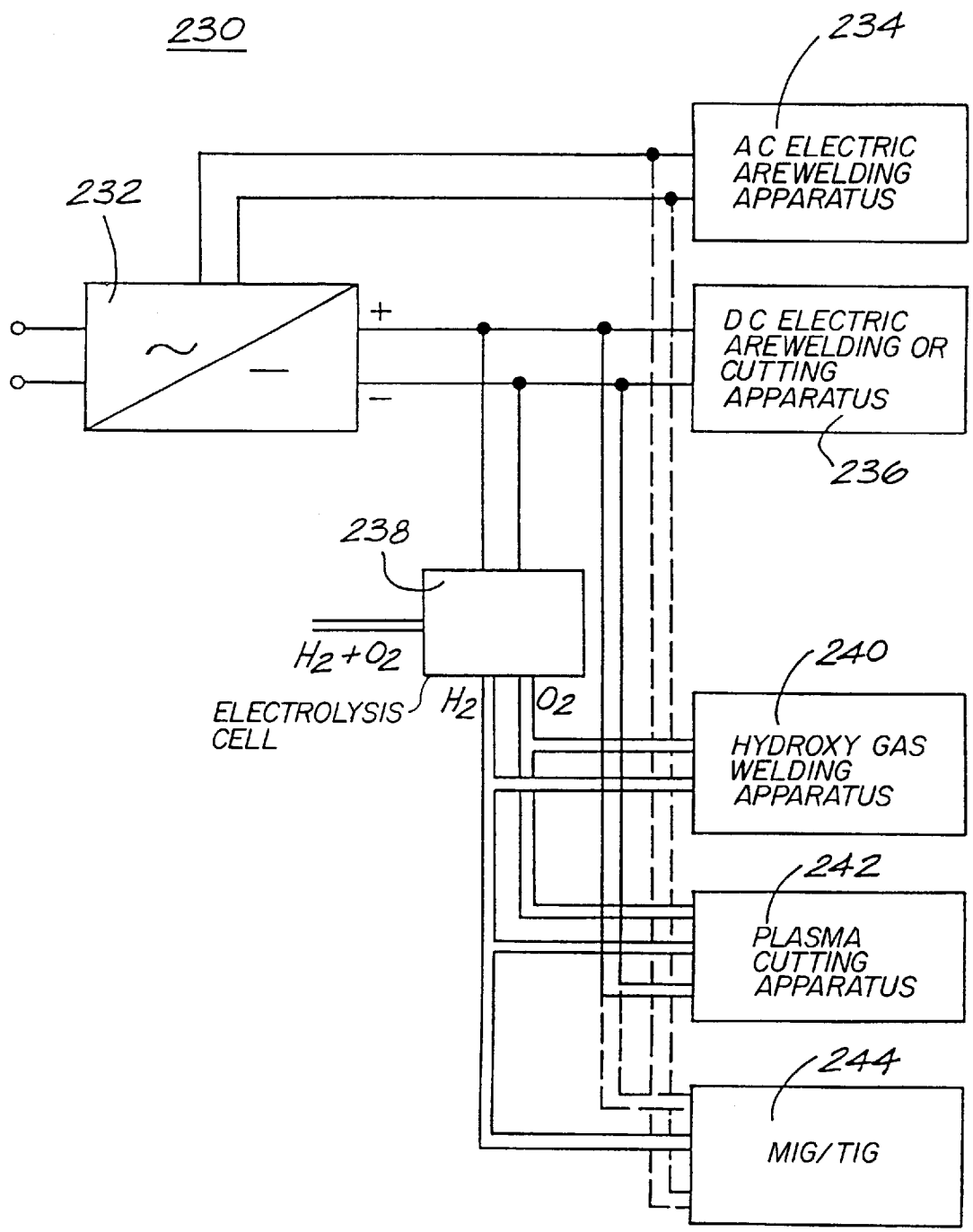
FIG. 20 shows a block diagram of a multi modal welding and cutting apparatus.

FIG. 20 shows in block diagram form a multi-modal cutting and welding apparatus 230. The apparatus receives a supply of DC power provided to an AC/DC converter 232. An AC supply is available for connection to AC electric arc welding apparatus 234, while the converted DC output voltage is provided for connection with a DC electric arc welding or cutting apparatus 236. The DC output supply voltage also is provided to an electrolysis cell unit 238 for the generation of, in this case, separated hydrogen and oxygen gases. The hydrogen and oxygen gases both are provided to a hydroxy gas welding apparatus 240. The hydrogen (and oxygen for secondary injection) is made available for connection with plasma cutting apparatus 242. The hydrogen is passed through a DC arc to produce a plasma stream, and on a secondary injection, the oxygen is introduced into the plasma stream to produce an oxidizing plasma cutting effect which increases cutting efficiency. Thicknesses of up to 150 mm can be cut with this process. It should be noted that introducing oxygen downstream from the tungsten electrodes eliminates any oxidation of the electrodes.

The hydrogen gas alone also is provided to a MIG/TIG apparatus 244, with the hydrogen in plasma form otherwise taking the place of the conventional inert gas. An AC or DC supply also is required to form the plasma.

The converter 232 can be of any conventional design, typically having a multi-tapped transformer for the selection of appropriate rectified DC voltages. The electrolysis unit 238 can be of any of the embodiments previously described, and including the scrubber and check valve arrangements. The various cutting and welding apparatus 234, 236, 240, 242, 244, described also are conventional.

The multi-modal apparatus 230 thus provides greater flexibility for the user in being able to select from the one unit the particular mode of cutting or welding required. Clearly, an apparatus comprised of any single or combination of welding/cutting apparatus is contemplated by the present invention.

Figure 21:
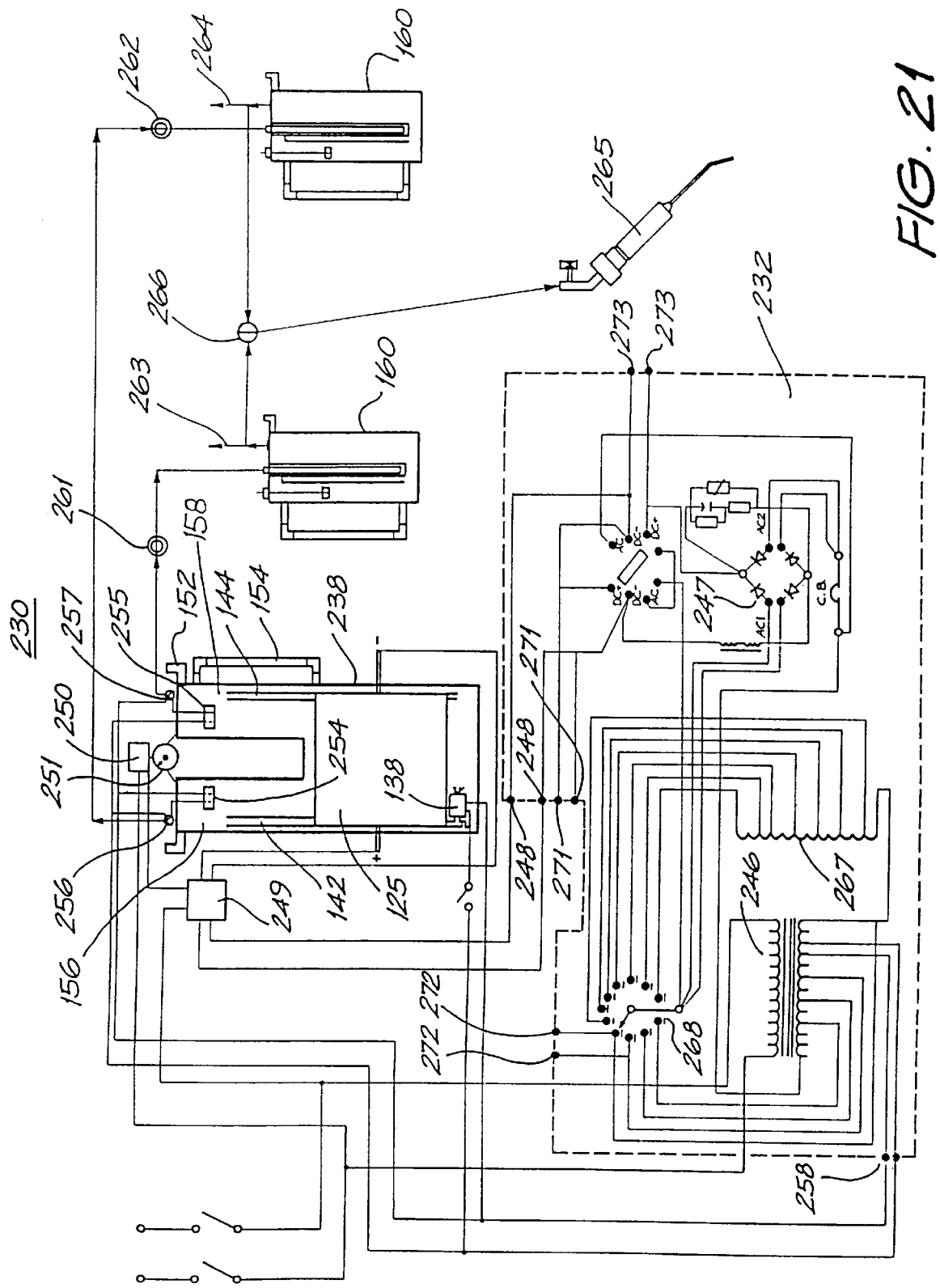
FIG. 21 shows a schematic diagram of the apparatus of FIG. 20.

FIG. 21 shows the multi-modal apparatus 230 in greater detail. As previously described, the electrolysis generator 238 separately produces gaseous hydrogen and oxygen and can also produce gaseous hydrogen and oxygen as an admixture.

The power supply unit 232 comprises a multi-tapped transformer 246. The reduced voltage is rectified by a bridge rectifier 247. The output rectified voltage is then connected by terminals 248 to the cell bank 238 containing 30 cells via a contactor 249 which is activated by a pressure switch 250. The switch 250 is, in turn, activated by a pressure sensor 251 which measures the gas pressure levels within the cell bank 238. Thus the contactor 249 is operable to remove the supply of power to the cell bank 238 on the establishment of an operational pressure. The contactor 249 operates on demand with use of the gas.

Thus, gas is produced as required, and typically for a total of 15 liters at any one time. This 15 liters of gasses comprises 10 liters of hydrogen and 5 liters of oxygen.

The gases are provided from the scrubbing towers 156, 158 of the cell bank 238. As a closed loop system, the pressure in each tower will compensate for the other, thereby maintaining constant desired gas production levels. If, however, the water level is too high due to excessive use of either gas, the respective float switch 254, 255 in the respective tower 156, 158 will disallow gas flow by shutting the respective solenoid valve 256, 257.

The float switches 254, 255 activate the solenoid valves 256, 257 from an AC supply 258 tapped from the transformer 246. Other float switches located in the check valve and scrubber units 160 and the pressuring pump 138, also receive the AC supply 258.

Two flow regulators 261, 262 are incorporated for the purpose of maintaining the desired back-pressure in the towers 156, 158 in order that the system will always have pressure even if the system is switched off and/or should the gases be exhausted through gas outlets, the gas outlets 263, 264 of the check valves/scrubber units 160 or by the welding tip 265.

As opposed to separated generation in the cell bank 238, method of obtaining an admixture is once the hydrogen and oxygen have passed through the check valve and scrubber units 160, a selection valve 266 allows the gases to mix and pass to the welding tip 265 where they are ignited and combusted to be used for the purposes of hydrogen/oxygen welding.

If the hydrogen and oxygen gases are produced separately and required for hydrogen plasma cutting 242 and/or hydrogen plasma MIG/TIG welding 244, the selection valve 266 disallows the admixture of the two gases.

The power supply unit 232 is a conventional arrangement of a multi-tapped transformer 246, including a reactor winding 267 and a range selector switch 268 which allows a selection of a chosen output voltage level. The generated secondary AC voltage also can be rectified by the rectifier 247 to produce a DC voltage output. All these output voltages pass another polarity selector 269 allowing the user to select between an AC or DC output and to select the appropriate polarity for the DC output.

The output 248 from the power supply unit 232 is shown connected to the electrolysis cell bank 238. However, the power supply also can connect with other forms of welding and cutting such as indicated in FIG. 20.

Another output 271 supplies the necessary DC power for hydrogen plasma shroud MIG/TIG welding 244 and hydrogen plasma oxidising cutting applications 242. Yet another AC output 272 and DC output 273 supply the necessary current to produce an arc for the MIG and TIG processes.

Output voltages in the range of 20–60 Volts are required for the cell bank unit 238 and the electric arc units 234, 263, whereas the MIG/TIG welding 244 operates, typically, on an output voltage of 30–60 Volts (AC or DC). Plasma cutting and plasma shrouding, as provided by the plasma unit 242, typically requires the supply of 120 Volts DC.

I claim:

1. A cell arrangement for the electrolysis of water, the arrangement comprising:
    a plurality of anode-forming electrodes in a parallel stacked relation, each anode electrode comprising a flat plate, and through which plates one or more conductive first interconnecting members pass and are electrically connected thereto; and
    a plurality of cathode-forming electrodes in a parallel stacked relation, each cathode electrode comprising a flat plate, and through which plates one or more conductive second interconnecting members pass and are electrically connected thereto;
    and wherein the anode electrodes and the cathode electrodes are interleaved, and the first interconnecting members and the second interconnecting members also pass through without electrical connection to apertures in the cathode electrodes and the anode electrodes, respectively.

2. The cell arrangement as claimed in claim 1, wherein a group of stacked anode electrodes forms an anode cell block, and a group of stacked cathode electrodes forms a cathode cell block, and whereby each anode cell block is interleaved over only a portion of its length with a corresponding cathode cell block.

3. The cell arrangement as claimed in claim 2, wherein for each cell block, the respective first or second interconnecting members extend only the length of the respective cell block.

4. The cell arrangement as claimed in any one of claims 1 to 3, wherein each electrode has a perforated inner portion, and an outer rim portion having holes through which the first and second interconnecting members pass.

5. The cell arrangement as claimed in claim 4, wherein the electrodes are circular in shape.

6. A cell bank arrangement for the electrolysis of water comprising a plurality of cell arrangements as claimed in claim 2 connected in series, and one or more said series connected cell arrangements connected in a parallel connection.

7. The electrolysis cell bank arrangement as claimed in claim 6, wherein there are the same number of said cell arrangements in each series connection, and said parallel connection is formed by a close-packed array of said series connected cell arrangements and further comprises at least one interconnecting bridge at each end of each cell arrangement, the bridges at each end respectively interconnecting anode electrodes of each cell arrangement and the cathode electrodes of each cell arrangement.

8. The cell arrangement as claimed in claim 1, wherein each electrode is hexagonally shaped, and the first interconnecting members extend through an electrode at a point near every alternate vertice, and the second interconnecting members extend through an electrode at the other ones of alternate vertices.

9. A cell bank arrangement comprising a plurality of cell arrangements as claimed in claim 1 formed as a linear array and interconnected in series.

10. The cell bank arrangement as claimed in claim 9, wherein the interconnecting members are rods, said rods including first anode rods which extend contiguously from one end of each cell arrangement to form the first anode rods of an adjacent cell arrangement and second cathode rods which extend contiguously from the other end of each cell arrangement to form the second cathode rods of an adjacent cell arrangement in the opposite direction.

11. The plurality of cell bank arrangements as claimed in claim 10, wherein the cell bank arrangements are arranged in a closed packed array and interconnected by conductive bridges at one or both ends of each cell bank arrangement.

12. An electrolysis system comprising:
 a cell arrangement as claimed in claim 1, and further comprising:
 a tank adapted for containing and immersing said cell arrangement in at least water, and
 DC voltage supply means, the positive supply of which is coupled to the anode electrodes and the negative supply of which is coupled to the cathode electrodes by a respective ones of the first and second interconnecting members to liberate oxygen and hydrogen gases respectively from said anode electrodes and said cathode electrodes.

13. The electrolysis system as claimed in claim 12, further comprising:
 pipe means to collect said hydrogen and oxygen gases as a gas admixture, and
 gas scrubbing means through which the collected gas passes, said gas scrubbing means having at least two separate passageways through which the admixed gas is forced to pass separated by at least one scrubbing liquid.

14. The electrolysis system as claimed in claim 13, wherein said scrubbing means comprises:
 a tank adapted for containing the scrubbing liquid to a partial level of the tank, and
 at least two vertically arranged columns within the tank, the first column having an upper end thereof for receiving the collected admixed gas and a lower end thereof open to the scrubbing liquid, and
 the second column having an upper end thereof open to receive firstly scrubbed gas and a lower end thereof open to the scrubbing liquid, the secondly scrubbed gas passing to outlet port means.

15. The electrolysis system as claimed in either one of claims 13 or 14, further comprising flow restrictor means through which said collected gas passes, thereby creating a back pressure on water in the tank.

16. The electrolysis system as claimed in claim 12, further comprising:
 a plurality of membranes, each of said membranes located between an adjacent anode electrode and cathode electrode, said membranes allowing the passage of ionic current between adjacent electrodes, but selectively blocking the flow of gas therethrough dependent upon a controllable pressure differential across the membrane.

17. The electrolysis system as claimed in claim 16, further comprising:
 a first water supply, said first water supply for providing water to the spaces surrounding the anode electrodes, and
 a second water supply, said second water supply for providing water to the spaces surrounding the cathode electrodes,
 adjacent anode and cathode spaces being separated by a said membrane, and
 wherein one of the said water supplies can be selectively pressurized by a pressurization unit so that a pressure differential exists across each membrane, thus permitting the flow of gas liberated by the anode or cathode electrode during electrolysis through the membrane.

18. The electrolysis system as claimed in claim 17, wherein said pressurization unit which pressurizes the one water supply includes a pump means.

19. The electrolysis system as claimed in claim 18, wherein each said water supply has an inlet and an outlet in communication with a tank adapted for enveloping the anode electrodes and cathode electrodes, and wherein said pump means is located within the inlet for either the anode electrodes or the cathode electrodes.

20. The electrolysis system as claimed in claim 19, further comprising flow restrictor means through which said liberated gases pass, thereby creating a back pressure on the water in the tank.

21. The electrolysis system as claimed in claim 19, further comprising DC voltage supply means, the positive supply of which is coupled to the first interconnecting members, and the negative supply of which is coupled to the second interconnecting members.

22. The electrolysis system as claimed in claim 19, wherein each of the outlets is in communication with a riser tube for the passage of liberated gas, and whereby each riser tube exits to baffle means at least partially immersed in water to scrub said liberated gas.

23. The electrolysis system as claimed in claim 22, further comprising gas receiver means to store said liberated gas.

24. The electrolysis system as claimed in claim 23, wherein each electrode has a perforated inner portion, and an outer rim portion having apertures through which the first and second interconnecting members pass.

25. The electrolysis system as claimed in claim 24, wherein said membranes extend only over said inner portion of an electrode.

26. The electrolysis system as claimed in claim 24, wherein the total surface area of each electrode, constituted by a non-perforated portion of the front and back surfaces and the walls forming the perforations through the thickness of the electrode, is substantially the same as a non-perforated electrode of having the same front and back overall surface dimensions.

27. The electrolysis system as claimed in claim 26, wherein the separation distance between the edges of adjacent perforations is substantially the same as the thickness of the electrode and the principal dimension of a perforation is substantially twice the thickness of the electrode.

28. The electrolysis system of claim 22, further comprising:
- a gas check valve including a tank containing a flame extinguishing liquid, and
- pipe means at one end in communication with an inlet of said check valve and at the other end thereof opening into said extinguishing liquid, and
- whereby, in use, any back-burning flame will force said extinguishing liquid through said pipe means, thus removing the supply of at least hydrogen gas to said inlet.

29. The gas check valve as claimed in claim 28, wherein said pipe means comprises one or more stand pipes forming a tortuous path for at least said hydrogen gas and said extinguishing liquid.

30. The electrolysis system as claimed in claim 19, further comprising:
- pipe means to collect the hydrogen and oxygen gases either as a gas admixture or separated gases, and
- either (i) gas scrubbing means through which the admixed gas passes, or (ii) two gas scrubbing means through which the separated hydrogen and oxygen gases respectively pass, each said gas scrubbing means having at least two separate passageways through which said gas is forced to pass separated by at least one scrubbing liquid.

31. The electrolysis system as claimed in claim 30, wherein each said scrubbing means comprises:
- a tank adapted for containing the scrubbing liquid to a partial level of the tank and at least two vertically arranged columns within the tank;
- the first column having an upper end thereof receiving the collected admixed gas and a lower end thereof open to the scrubbing liquid, and
- the second column having the upper end thereof open to receive firstly scrubbed gas and the lower end thereof open to the scrubbing liquid, the secondly scrubbed gas passing to outlet port means.

32. A multi-modal electro-gas generator for welding and cutting, comprising:
- a power supply controllable to produce a plurality of AC and DC voltage sources; and
- an electrolysis system as claimed in claim 18, wherein said electrolysis system is operable to selectively produce either separated hydrogen and oxygen gases or admixed hydrogen and oxygen gas from a supply of water by electrolysis due to a DC voltage source of the power supply; the hydrogen and oxygen gases or admixed hydrogen and oxygen gas, together with the voltage sources, being available for connection to welding and cutting apparatus.

33. The multi-modal generator as claimed in claim 32, further comprising means for scrubbing the hydrogen and oxygen gases or admixed hydrogen and oxygen gas.

34. The multi-modal generator as claimed in claim 33, wherein the hydrogen and oxygen gases are adapted for connection to means for gas welding and means for plasma cutting, and the hydrogen gas is adapted for connection to any one or more of means for metal-inert-gas or tungsten-inert-gas plasma cutting and welding, and said DC voltage sources are adapted for connection to any one or more means for plasma cutting and means for metal-inert-gas or tungsten-inert-gas plasma cutting or welding, said AC voltage sources are adapted for connection to either one or both of means for metal-inert-gas or tungsten inert-gas plasma cutting and welding.

35. The multi-modal electro-gas generator of claim 34, further comprising a welding tip for said admixed hydrogen and oxygen gas, and having a flashback arrester for said welding tip, said arrester comprising a meshed barrier in the stream of a passage for the gases to be combusted, the meshed barrier having an opening of a size to allow free passage of the gases, and to impede passage of a flashback by the flashback flame being unable to pass the barrier, so as to be extinguished.

36. The electrolysis system as claimed in claim 16, wherein the membrane is made of PTFE material.

37. An apparatus comprising:
- the electrolysis system of claim 16, and
- an oxidizing plasma cutting apparatus having
  - a primary hydrogen injection means and
  - secondary oxygen injection means
- wherein said separated hydrogen and oxygen gases are supplied to a respective said injection means of said cutting apparatus.

38. The apparatus as claimed in claim 37, further comprising DC voltage supply means to provide an arc to cause a plasma of the primary injected hydrogen.

39. An apparatus comprising:
- the electrolysis system of claim 12, and
- a hydrogen fired plasma furnace, said furnace receiving at least said hydrogen gas.

40. The apparatus as claimed in claim 39, further comprising a plurality of membranes, each of said membranes located between an adjacent anode electrode and cathode electrode, said membranes allowing the passage of ionic current between adjacent anode and cathode electrodes, but blocking the flow of gas therethrough to separately liberate oxygen gas and hydrogen gas from said anode electrodes and cathode electrodes.

41. The cell arrangement as claimed in claim 1, further comprising a plurality of membranes, each of said membranes located between an adjacent anode electrode and cathode electrode, said membranes allowing the passage of ionic current between adjacent electrodes, but selectively blocking the flow of gas therethrough dependent upon a controllable pressure differential across the membrane.

42. A cell arrangement for the electrolysis of water, the arrangement comprising:
- a plurality of anode-forming electrodes in a parallel stacked relation, each anode electrode comprising a flat plate, and through which plates one or more conductive first interconnecting members pass and are electrically connected thereto;
- a plurality of cathode-forming electrodes in a parallel stacked relation, each cathode electrode comprising a flat plate, and through which plates one or more conductive second interconnecting members pass and are electrically connected thereto; and
- wherein the anode electrodes and the cathode electrodes are interleaved, and each electrode is provided with a plurality of flanges and slots alternatingly arranged at the edge margin of the electrodes, and whereby in the interleaved arrangement of electrodes a flange passes through a slot of an adjacent electrode without making electrical connection therewith to connect only with the next adjacent electrode.

43. The cell arrangement as claimed in claim 42, further comprising a plurality of membranes, each of said membranes located between an adjacent anode electrode and cathode electrode, said membranes allowing the passage of ionic current between adjacent electrodes, but selectively blocking the flow of gas therethrough dependent upon a controllable pressure differential across the membrane.

* * * * *

UNITED STATES PATENT AND TRADEMARK OFFICE
CERTIFICATE OF CORRECTION

PATENT NO.   : 5,843,292
DATED        : Dec. 1, 1998
INVENTOR(S)  : SPIROS

It is certified that error appears in the above-identified patent and that said Letters Patent is hereby corrected as shown below:

On the title page, Item [63], change "August 6,1994" to --September 6,1994--

Signed and Sealed this

Twentieth Day of July, 1999

Attest:

Q. TODD DICKINSON

Attesting Officer

Acting Commissioner of Patents and Trademarks